United States Patent
Zhang et al.

(10) Patent No.: US 8,374,273 B1
(45) Date of Patent: Feb. 12, 2013

(54) METHOD AND APPARATUS FOR TRANSMIT BEAMFORMING

(75) Inventors: Hongyuan Zhang, San Jose, CA (US); Zhiyu Yang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 863 days.

(21) Appl. No.: 12/059,846

(22) Filed: Mar. 31, 2008

Related U.S. Application Data

(60) Provisional application No. 60/908,989, filed on Mar. 30, 2007, provisional application No. 60/939,712, filed on May 23, 2007.

(51) Int. Cl.
*H04B 7/12* (2006.01)
*H04L 1/02* (2006.01)
*H04L 27/00* (2006.01)

(52) U.S. Cl. .................... 375/267; 375/259; 375/260

(58) Field of Classification Search .................. 375/267
See application file for complete search history.

(56) References Cited

U.S. PATENT DOCUMENTS

| | | | |
|---|---|---|---|
| 6,049,607 A * | 4/2000 | Marash et al. | 379/406.08 |
| 6,363,033 B1 | 3/2002 | Cole et al. | |
| 6,658,141 B1 * | 12/2003 | Jeong | 382/128 |
| 7,899,110 B1 | 3/2011 | Zhang et al. | |
| 2001/0022783 A1 * | 9/2001 | Ohki | 370/338 |
| 2002/0193146 A1 * | 12/2002 | Wallace et al. | 455/562 |
| 2006/0072485 A1 * | 4/2006 | Cairns et al. | 370/290 |
| 2007/0226287 A1 | 9/2007 | Lin et al. | |
| 2009/0190642 A1 * | 7/2009 | Brueninghaus et al. | 375/224 |
| 2009/0225823 A1 * | 9/2009 | Chen et al. | 375/230 |
| 2009/0225876 A1 * | 9/2009 | Sung et al. | 375/260 |
| 2010/0321216 A1 * | 12/2010 | Jonsson et al. | 341/61 |

OTHER PUBLICATIONS

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: High-Speed Physical Layer in the 5 GHZ Band," IEEE Std. 802.11a, 1999.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-Speed Physical Layer Extension in the 2.4 GHz Band," IEEE Std. 802.11b, 1999.

S. A. Mujtaba, "IEEE P802.11—Wireless LANS, TGn Sync Proposal Technical Specification," doc.: IEEE 802.11—04/0889r6, May 2005.

"Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher-Speed Physical Layer Extension in the 2.4 GHz Band," IEEE Std. 802.11g/D2.8, May 2002.

S. Guncavdi, et al., "A Space-Time Pre-RAKE Transmitter Diversity Method for W-CDMA Using Long Range Prediction," Proceedings of 35th Annual Conference on Information Sciences and Systems, CISS'01, vol. 1, pp. 32-37. Mar. 2001.

R. Irmer, et al. "MISO concepts for frequency-selective channels," International Zurich Seminar on Broadband Communications, IZS'02, pp. 40/1-40/6, Zurich, Switzerland,. Feb. 19-21, 2002.

(Continued)

*Primary Examiner* — Erin File

(57) ABSTRACT

A rake receiver having a plurality of rake fingers is adapted based on a plurality of received signals. The plurality of received signals correspond to a single signal transmitted by a single antenna transceiver and received by a multiple antenna transceiver that includes the rake receiver. Each of a plurality of groups of rake fingers corresponds to a single-input, multiple output (SIMO) channel estimate. One coefficient from each of the plurality of SIMO channel estimates is selected, and a transmit steering vector is calculated based on the selected coefficients. The transmit steering vector is applied to a signal to be transmitted by the multiple antenna transceiver to the single antenna transceiver.

20 Claims, 15 Drawing Sheets

OTHER PUBLICATIONS

V. Erceg, et al., "IEEE P802.11: Wireless LANs: TGn Channel Models," Doc.: IEEE 802.11-03/940r4, May 2004.

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

\* cited by examiner

METHOD AND APPARATUS FOR TRANSMIT BEAMFORMING

CROSS-REFERENCES TO RELATED APPLICATIONS

The present application claims the benefit of U.S. Provisional Application No. 60/908,989, entitled "Transmit Beamforming for SDD/CCK (802.11b) Systems with Multiple Transmit Antennas," filed on Mar. 30, 2007, which is hereby incorporated by reference herein in its entirety.

The present application also claims the benefit of U.S. Provisional Application No. 60/939,712, entitled "Transmit Beamforming for DSSS/CCK (802.11b) Systems with Multiple Transmit Antennas," filed on May 23, 2007, which is hereby incorporated by reference herein in its entirety.

FIELD OF THE DISCLOSURE

The present disclosure relates generally to wireless communication systems and, more particularly, to a method and apparatus for transmit beamforming while transmitting information via a multiple-input, single-output wireless communication channel.

BACKGROUND

An ever-increasing number of relatively cheap, low power wireless data communication services, networks and devices have been made available over the past number of years, promising near wire speed transmission and reliability. Various wireless technology is described in detail in the Institute for Electrical and Electronics Engineers (IEEE) 802.11 Standard, including for example, the IEEE Standard 802.11a (1999) and its updates and amendments, the IEEE Standard 802.11b (1999), the IEEE Standard 802.11g (2003), as well as the IEEE Standard 802.11n now in the process of being adopted, all of which are collectively incorporated herein fully by reference. Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards perforin multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further compensate for deleterious effects associated with the various propagation paths, and to thereby improve transmission performance, it is also known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD).

Unlike the 802.11a/802.11g/802.11n IEEE standards, systems compliant with the IEEE 802.11b Standard utilize a single carrier and direct sequence spread-spectrum (DSSS) complimentary code keying (CCK). An IEEE 802.11b compliant transceiver may utilize multiple antennas, and such a transceiver may communicate with other IEEE 802.11b transceivers that do not have multiple antennas. A communication channel from a single antenna transmitter to a multiple antenna receiver may be referred to as a single-input, multiple-output (SIMO) channel. Similarly, a communication channel from a multiple antenna transmitter to a single antenna receiver may be referred to as a multiple-input, single-output (MISO) channel.

A multiple antenna transceiver receiving signals from a single antenna transceiver may combine the signals received via the multiple antennas in order to improve a signal-to-noise ratio (SNR) associated with the SIMO channel. Various techniques for combining signals received via the multiple antennas are known to those of ordinary skill in the art. But the IEEE 802.11b Standard does not provide an interoperable protocol for channel training for transmit beamforming. As a result, many multiple antenna transceivers do not utilize transmit beamforming when transmitting according to the IEEE 802.11b Standard to a single antenna receiver. For example, such a multiple antenna transceiver may merely transmit the same signal from all of its antennas.

SUMMARY OF THE DISCLOSURE

In one embodiment, a method includes adapting a rake receiver having a plurality of rake fingers based on a plurality of received signals. The plurality of received signals correspond to a single signal transmitted by a single antenna transceiver and received by a multiple antenna transceiver that includes the rake receiver. Each of a plurality of groups of rake fingers corresponds to a single input, multiple output (SIMO) channel estimate. The method also includes selecting one coefficient from each of the plurality of SIMO channel estimates, and generating a transmit steering vector based on the selected coefficients. Additionally, the method includes applying the transmit steering vector to a signal to be transmitted by the multiple antenna transceiver to the single antenna transceiver.

In another embodiment, an apparatus comprises a rake receiver having a plurality of groups of rake fingers corresponding to a plurality of SIMO channel estimates. The SIMO channel estimates correspond to a plurality of SIMO channels between a multiple antenna transceiver and a single antenna transceiver. The apparatus additionally comprises a coefficient selection unit coupled to the rake receive. The coefficient selection unit selects one coefficient from each of the plurality of SIMO channel estimates. Also, the apparatus comprises a transmit steering vector calculation unit coupled to the coefficient selection unit, and a transmit steering unit to apply the transmit steering vector to a signal to be transmitted by the multiple antenna transceiver.

In yet another embodiment, a method includes receiving via a plurality of SIMO channels from a single antenna transceiver, and adapting a rake receiver based on the received signal. The rake receiver includes a plurality of groups of rake fingers for each of the SIMO channels, wherein each group of rake fingers corresponds to a SIMO channel estimate. Also, the method includes selecting one coefficient from each of the SIMO channel estimates, and generating a transmit steering vector based on the selected coefficients. Additionally, the method includes storing the transmit steering vector in a memory segment associated with the single antenna transceiver. Further, the method includes retrieving the steering vector from the memory segment, and applying the transmit steering vector to a signal to be transmitted from a multiple antenna transceiver to the single antenna transceiver.

In still another embodiment, an apparatus comprises a plurality of correlators to generate a plurality of correlation signals based on correlating each of a plurality of received signals with a barker sequence. Each received signal corresponds to a respective antenna of a multiple antennas transceiver. Additionally, the apparatus comprises a rake receiver coupled to the plurality of correlators. The rake receiver includes a plurality of rake fingers corresponding to the plurality of correlation signals. Each of a plurality of groups of rake fingers corresponds to an estimate of a SIMO channel. The apparatus also includes a coefficient selection unit coupled to the rake receiver. The coefficient selection unit selects one coefficient from each of the plurality of SIMO channel estimates. The apparatus further comprises a transmit steering vector calculation unit coupled to the coefficient selection unit, and a transmit steering vector memory coupled to the transmit steering vector calculation unit to store transmit steering vectors generated by the transmit steering vector calculation unit. Still further, the apparatus comprises a transmit steering unit coupled to the transmit steering vector memory, the transmit steering unit to apply transmit steering vectors from the transmit steering vector memory.

DETAILED DESCRIPTION

Figure 1:
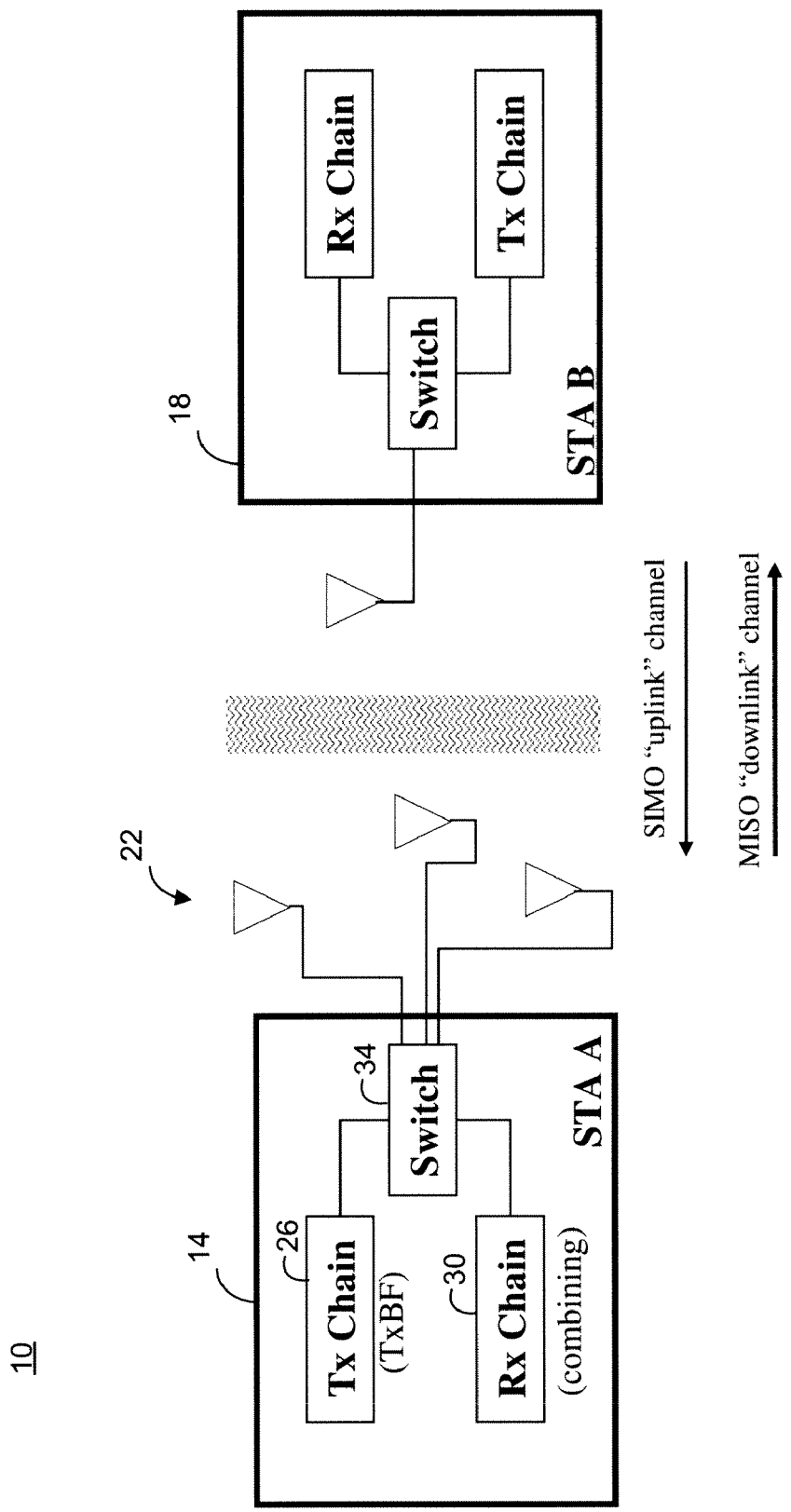
FIG. 1 is a block diagram of an example communication system in which transmit steering techniques such as described herein may be utilized.

FIG. 1 is a block diagram of an example communication system 10 having a multiple antenna transceiver 14 and a single antenna transceiver 18. For example, the multiple antenna transceiver 14 may be a wireless local area network (WLAN) router, and the single antenna transceiver 18 may be a mobile unit. The channel from the single antenna transceiver 18 to the multiple antenna transceiver 14 may be referred to as a SIMO channel, and the channel from the multiple antenna transceiver 14 to the single antenna transceiver 18 may be referred to as MISO channel. Although in FIG. 1 the SIMO channel is referred to as an "uplink" channel and the MISO channel is referred to as a "downlink" channel, it is to be understood that these are merely arbitrary labels. For example, the "uplink" and "downlink" labels are not meant to imply that the multiple antenna transceiver 14 must be an access point or WLAN router and the single antenna transceiver 18 must be a mobile unit. On the contrary, in some circumstances, the multiple antenna transceiver 14 may be mobile unit, and the single antenna transceiver 18 may be an access point or WLAN router, for example.

The multiple antenna transceiver 14 may include a plurality of antennas 22. Although three antennas are illustrated in FIG. 1, the transceiver 14 may include 2, 4, 5, 6, . . . or any other number of antennas greater than one. The transceiver may include a transmit chain 26, a receive chain 30, and a switch 34 that selectively couples the transmit chain 26 and the receive chain 30 to the plurality of antennas 22. For example, when the transceiver 14 is to transmit, the switch 34 may couple the transmit chain 26 to the plurality of antennas 22, and may isolate the receive chain 30 from the plurality of antennas 22. Similarly, when the transceiver 14 is to receive, the switch 34 may couple the receive chain 30 to the plurality of antennas 22, and may isolate the transmit chain 26 from the plurality of antennas 22.

The receive chain 30 is capable of forming estimates of the channels between the single antenna of the transceiver 18 and each of the antennas 22 (the "SIMO channel estimates"). For example, in one embodiment, the receive chain 30 may include a rake receiver, and the rake receiver may include a group of "fingers" for each antenna 22. When receiving signals transmitted by the transceiver 18, the rake receiver may adapt to the multiple channels between the single antenna of the transceiver 18 and each of the antennas 22. In particular, each group of rake fingers may adapt to the corresponding channel between a respective antenna 22 and the transceiver 18. Once adapted, each group of rake fingers may comprise a matched filter that estimates the corresponding channel between a respective antenna 22 and the transceiver 18. In other words, each group of rake fingers may correspond to an estimate of a corresponding SIMO channel. In other embodiments, the rake receiver may include more "fingers" than antennas 22 or SIMO channels.

The SIMO channel estimates may be provided to the transmit chain 26. The transmit chain 26 may utilize the SIMO channel estimates to perform transmit beamforming on signals to be transmitted to the transceiver 18 via the multiple antennas 22.

Figure 2:
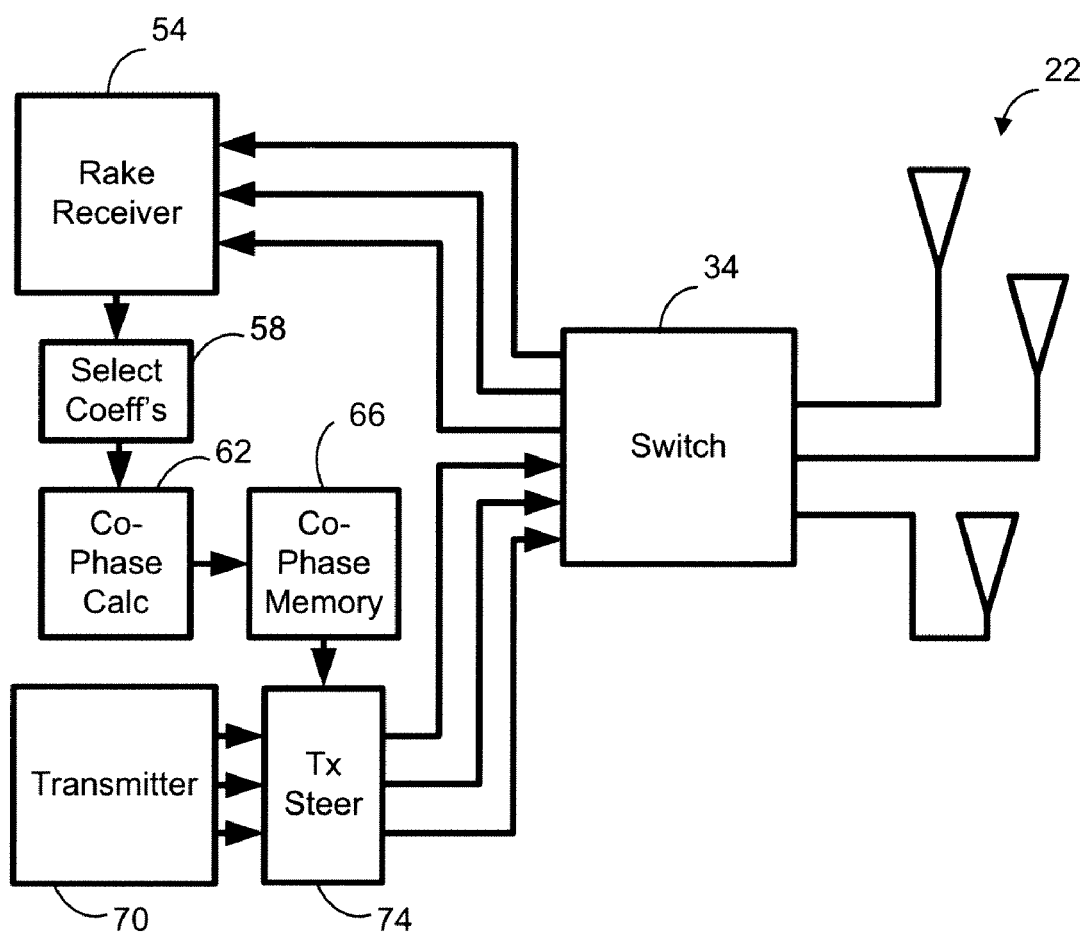
FIG. 2 is a block diagram of an example multiple antenna transceiver that may utilize transmit steering techniques such as described herein.

FIG. 2 is a block diagram of an example multiple antenna transceiver 50 that may be utilized as the transceiver 14 of FIG. 1. It is to be understood, however, that transceivers other than the transceiver 50 may be utilized as the transceiver 14 of FIG. 1. Although the transceiver 50 is illustrated having three antennas 22 in FIG. 2, the transceiver 50 may include 2, 4, 5, 6, . . . or any other number of antennas greater than one. As with the transceiver 14 of FIG. 1, the transceiver 50 of FIG. 2 includes a switch 34 that selectively couples a transmit chain and a receive chain to the plurality of antennas 22.

The transceiver 50 includes a multi-antenna rake receiver 54. In one embodiment, the rake receiver 54 may include a group of "fingers" for each antenna 22 or for each SIMO channel. When receiving signals transmitted by a single antennas transceiver, the rake receiver 54 may adapt to the multiple SIMO channels between the single antenna of the other transceiver and each of the antennas 22. In particular, each group of rake fingers may adapt to the corresponding SIMO channel between a respective antenna 22 and the single antenna transceiver. Once adapted, each group of rake fingers may comprise a matched filter that estimates the corresponding channel between a respective antenna 22 and the single antenna transceiver. In other words, each group of rake fingers may be an estimate of a SIMO channel. In one embodiment, the SIMO channels that are estimated by the rake fingers may be represented as a plurality of finite impulse response (FIR) filters having coefficients $h_j^i$, where i=0, ..., R−1; R is the number of SIMO channels (or the number of antennas at the multi-antenna device); and j=0, 1, ..., L−1; and L is the number of filter coefficients (or finger taps). In other words, the notation $h_j^i$ indicates the $j^{th}$ coefficient of the channel impulse response corresponding to the $i^{th}$ SIMO channel. One group of rake fingers is associated with each of the SIMO channels, and the rake fingers may have coefficients $C_j^i$, where i=0, ..., R−1; and j=0, 1, ..., L−1. In other words, the notation $C_j^i$ indicates the $j^{th}$ coefficient (finger) of the $i^{th}$ group of rake fingers. The coefficients (fingers) of each group of rake fingers may be adapted so that the group of rake fingers estimates a SIMO channel. In particular, each group of rake fingers may attempt to form a conjugate of a corresponding SIMO channel, which may involve attempting to invert the SIMO channel and time-align with the SIMO channel. Ideally, $C_j^i$ should equal or approximate $(h_j^i)^*$.

The transceiver 50 also includes a coefficient selector block 58 for selecting particular coefficients of the adapted rake receiver 54. In particular, the coefficient selector block 58 selects one coefficient from each SIMO channel estimate. In one embodiment, a spatially combined (or steered) channel gain may be maximized by selecting a common coefficient index for all of the SIMO channel estimates:

$$\max_l \sum_{i=0}^{R-1} |h_l^i|. \qquad \text{(Equation 1)}$$

If there are three antennas 22, Equation 1 can be written as:

$$\max_l (|h_l^0| + |h_l^1| + |h_l^2|). \qquad \text{(Equation 2)}$$

In another embodiment, a spatially combined (or steered) channel gain may be maximized by selecting a coefficient index for each of the SIMO channel estimates:

$$\sum_{i=0}^{R-1} \max_l |h_l^i|. \qquad \text{(Equation 3)}$$

If there are three antennas 22, Equation 3 can be written as:

$$\left( \max_l (|h_l^0| + \max_l |h_l^1| + \max_l |h_l^2|) \right). \qquad \text{(Equation 4)}$$

Selecting one coefficient from each SIMO channel estimates according to Equation 1 or Equation 3 can be implemented in a variety of ways. In embodiments described below, the selection is implemented based on a Bit_Sync signal that generally indicates a center of a received symbol. U.S. patent application Ser. No. 11/957,245, entitled "Bit Sync for Receiver with Multiple Antennas," filed on Dec. 14, 2007, which is hereby incorporated by reference herein, describes various techniques for generating the Bit_Sync signal. Of course, in other embodiments, the selection of one coefficient from each SIMO channel estimate may be implemented without being based on the Bit_Sync signal.

The coefficient selector block 58 attempts to select SIMO channel estimate coefficients after the rake fingers have had an opportunity to adapt to the SIMO channels. For instance, in an implementation to be used with the IEEE 802.11b Standard, the coefficient selector block 58 may select SIMO channel estimate coefficients after an end of a preamble or a header has been received. In one embodiment, the coefficient selector block 58 may select SIMO channel estimate coefficients after each preamble or header is received.

The transceiver 50 also includes a co-phasing (or steering) vector calculator 62. The steering vector calculator 62 calculates a steering vector based on the coefficients selected by the coefficient selector block 58. In one embodiment, the steering vector calculator 62 may calculate a new steering vector in response to each set of coefficients selected by the coefficient selector block 58. For instance, in one embodiment for use with the IEEE 802.11b Standard, the coefficient selector block 58 may calculate a steering vector after each preamble or header is received. The calculated steering vector may be stored in a co-phasing (or steering) vector memory 66. The steering vector stored in the memory 66 may be associated with an identifier of the station to which the steering vector corresponds. This may assist the transceiver 50 in utilizing the appropriate steering vector when the transceiver 50 is communicating with multiple other transceivers. As just one example, the steering vector in the memory 66 may be associated with a media access control (MAC) address of the transceiver to which the steering vector corresponds.

The transceiver 50 also includes a transmit chain 70 coupled to a transmit steering block 74. The transmit steering block 74 is coupled to the steering vector memory 66, and utilizes steering vectors stored in the vector memory 66.

Figure 3:
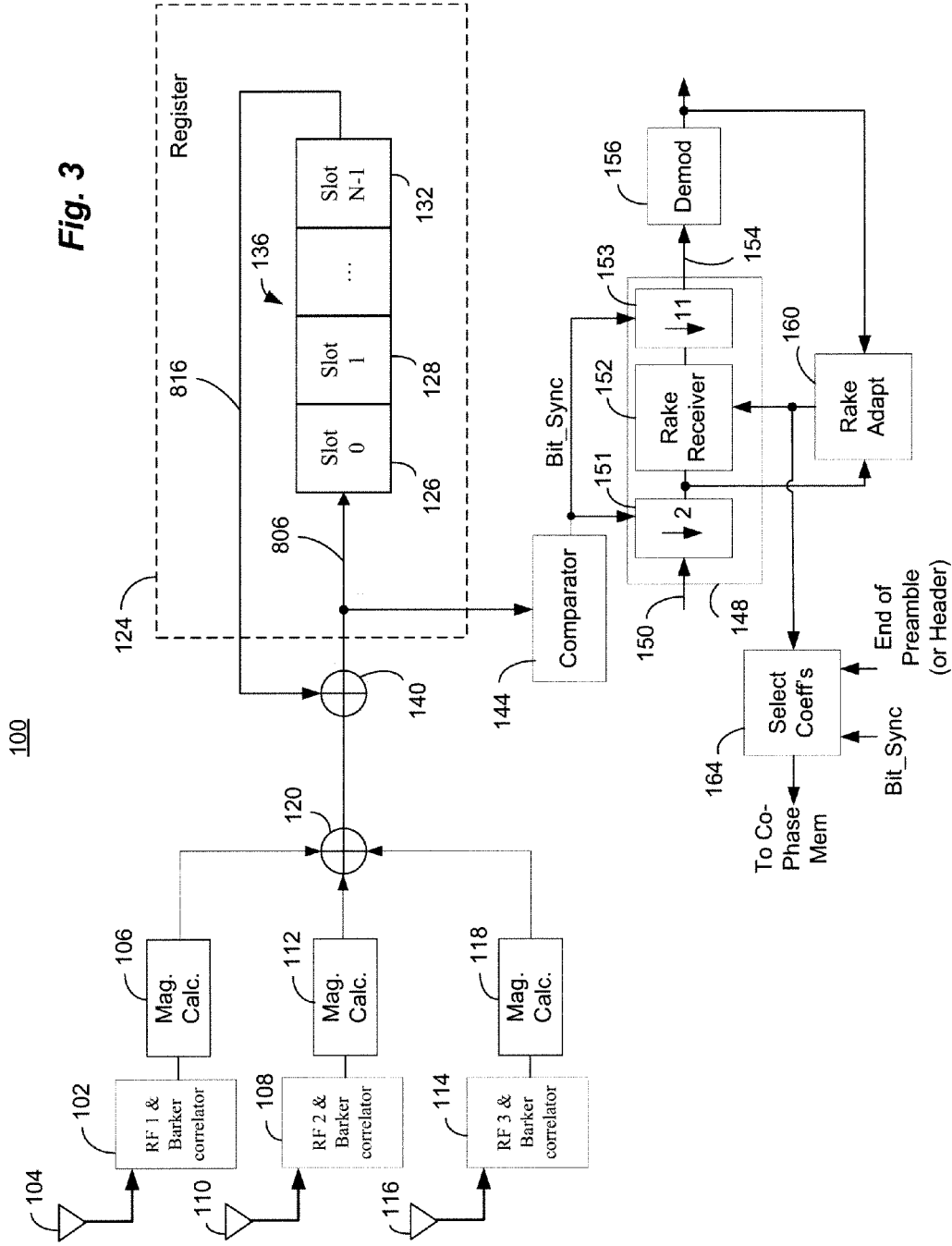
FIG. 3 is a block diagram of an example receive chain of a multiple antenna transceiver that includes a rake receiver.

FIG. 3 is a block diagram of an example receive chain 100 of a multiple antenna transceiver. A first radio frequency (RF) section and correlator 102 may be coupled to a first antenna 104. In the case of a transceiver configured to operate according to the IEEE 802.11(b) Standard, the correlator 102 may be a Barker code correlator. The output of the first RF section and correlator 102 may be coupled to a magnitude calculator 106.

A second RF section and correlator 108 may be coupled to a second antenna 110. The output of the second RF section and correlator 108 may be coupled to a second magnitude comparator 112.

In some embodiments, the two RF sections and correlators 102 and 108 may provide the desired diversity. In other embodiments, one or more additional RF sections may be present. In the embodiment corresponding to FIG. 3, the transceiver includes a third RF section and correlator 114, and a third antenna 116 coupled to the third RF section and correlator 114. In turn, the third RF section and correlator 114 may be coupled to a third magnitude calculator 118.

The magnitude calculators 106, 112, and 118 are discussed in more detail below with reference to FIG. 4. The output of each magnitude calculator 106, 112, 118 may be combined or added at a summing circuit 120. The summing circuit 120 may provide a sum output of the signals appearing at inputs of the summing circuit 120.

The receive chain 100 also may include a register circuit 124. The register circuit 124 may include a plurality of N registers 126, 128, 132 arranged as a shift register 136. As will be described in more detail below, the register circuit 124 permits data from multiple symbols to be combined or summed. The registers 126, 128, 132 may correspond to "slots" in a symbol, which may correspond to elements or bits of a spreading code or correlation code. The number N of registers 126, 128, 132 may be based on the length of the spreading code or correlation code to be used. For example, if a Barker code of length eleven is used, the register circuit 124 may include eleven registers/slots 126, 128, 132 or some multiple of eleven (if oversampling is utilized, for example). In one specific embodiment that may be utilized in an IEEE 802.11b environment, there may be 22 registers/slots 126, 128, 132 (corresponding to a length-11 barker code with 2-times oversampling). In this embodiment, the shift register 136 may shift at a rate of 22 MHz.

A summing circuit 140 may be coupled between the summing circuit 120 and the register circuit 124. In particular, a first input of the summing circuit 140 may be coupled to an output of the summing circuit 120, and a second input of the summing circuit 140 may be coupled to an output of the shift register 136. An output of the summing circuit 140 may be coupled to an input of the shift register 136. The register 136 may be initialized to zero. Then, as symbols are received by the three antennas 104, 110, 116, correlation data is shifted into the shift register 136. Because of the feedback from the output of the shift register 136 and the summing circuit 140, correlation data from the slots of multiple symbols is combined. For example, in an embodiment to be utilized in an IEEE 802.11b environment with 22 registers 126, 128, 132 (corresponding to a length-11 barker code with 2-times oversampling), each register may include a sum of respective slots over multiple symbols. For instance, the register 126 may include a sum of first slots from multiple symbols. Similarly, the register 128 may include a sum of second slots from multiple symbols, and so on.

A comparator 144 is coupled to the output of the summing circuit 140. The comparator 144 may become active at the end of some specified number of symbols (after the register 36 was initialized to zero). Then, during a last symbol, the comparator may monitor the output of the summing circuit 144 to detect a maximum value. For example, if slot data is to be combined over 3 symbols, the register 136 may be initialized to zero prior to the first symbol. Then, the comparator 144 may become active after the second symbol and monitor the output of the summing circuit 144 during the third symbol. When the comparator 144 detects the maximum value, it may generate a Bit_Sync signal. In an embodiment to be utilized in an IEEE 802.11b environment, the Bit_Sync signal represents the location in a 1 microsecond symbol period corresponding to the slot with the highest correlation value.

The Bit_Sync signal may be coupled to a rake receiver system 148. The rake receiver system 148 may have a plurality of inputs 150 coupled to the outputs of the barker code correlators 102, 108, 114. The rake receiver system 148 also may include and an output 154. The Bit_Sync signal may be used by the rake receiver system 148 to center its rake fingers. In one embodiment, the rake receiver system 148 may include a 2× downsampler 151 and an 11× downsampler 153, coupled at an input and an output, respectively, of a rake receiver 152. In this embodiment, sampling times of the 2× downsampler 151 and the 11× downsampler 153 may be based on the Bit_Sync signal.

The output 154 of the rake receiver system 148 may be coupled to a demodulator 156. A rake adaptation block 160 may be coupled to the rake receiver system 148 and may adapt the rake receiver 152. In particular, the rake adaptation block 160 may adapt the SIMO channel estimate coefficients. In the embodiment of FIG. 3, the rake receiver 152 may include three groups of fingers (one for each of the three antennas 104, 110, 116, or one for each SIMO channel), and the rake adaptation block 160 may adapt the coefficients of the three groups of rake fingers (or SIMO channel estimates). The rake adaptation block 160 may be coupled to the output of the demodulator 156 and the outputs of the 2× downsampler 151, and may adapt the three sets of SIMO channel estimate coefficients based on the output of the demodulator 156 and the outputs of the 2× downsampler 151.

A coefficient selection block 164 may be coupled to the rake adaptation block 160. The coefficient selection block 164 may receive the Bit_Sync signal. The coefficient selection block 164 also may receive a signal that indicates when the rake coefficients have been adequately adapted. For example, in an embodiment to be utilized in an IEEE 802.11b environment, the coefficient selection block 164 may receive a signal that indicates the end of a preamble (or the end of a header) has been received. The coefficient selection block 164 may select one adapted coefficient from each group of rake fingers (wherein each group of rake fingers is a SIMO channel estimate) based on the Bit_Sync signal and the signal indicating that the rake coefficients have been adequately adapted, as will be described in more detail below. In other embodiments, the signal that indicates when the rake coefficients have been adequately adapted may be a signal that indicates a specified time period has elapsed (such as a specified length of time after the start of a received signal), an error level or error rate has met or fallen below a threshold, etc.

Figure 4:
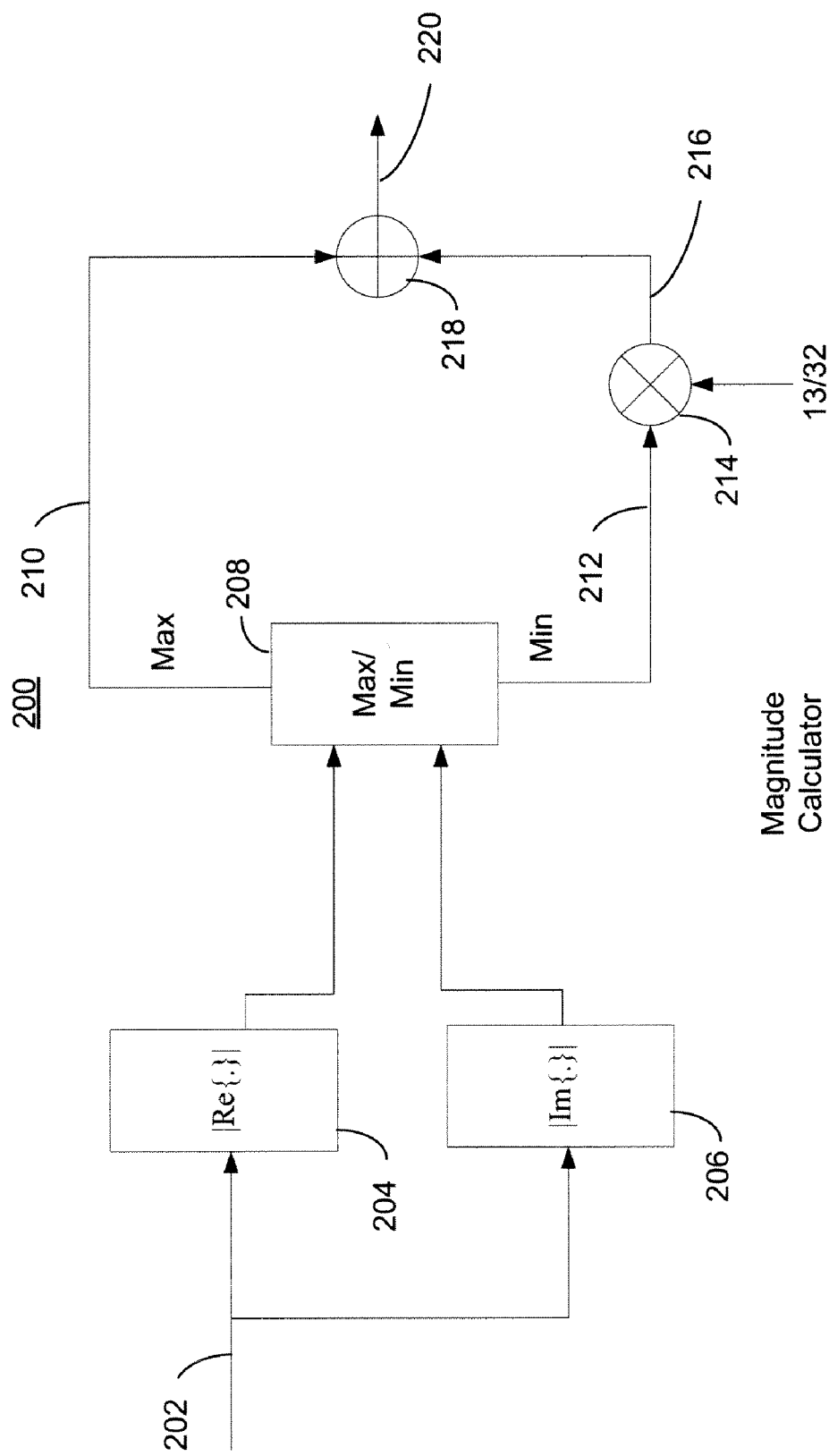
FIG. 4 is a block diagram of an example magnitude calculator that may be utilized in the receive chain of FIG. 3.

FIG. 4 is a block diagram of an example magnitude calculator 200 that may be utilized for the magnitude calculators 106, 112, and 118 of FIG. 3. It will be understood, however, that other types of suitable magnitude calculators 106, 112, and 118 may also be utilized, including known magnitude calculators. The magnitude calculator 200 may take an input signal 202 and process it at real and imaginary magnitude blocks 204 and 206, respectively. The respective outputs of the real 204 and imaginary 206 blocks may be fed to a maximum/minimum block 208. The maximum/minimum block 208 may take the larger of the two input signals and output it over connection 210 while the smaller of the two input signals may be output over connection 212. The minimum output on connection 212 may be fed to a multiplier 214 where the signal is multiplied by the constant 13/32 to account for a base noise floor. The output of the multiplier 214 may be coupled over connection 216 to a summing circuit 218 where the signals on connections 216 and 210 are added and the output presented on connection 220.

Figure 5:
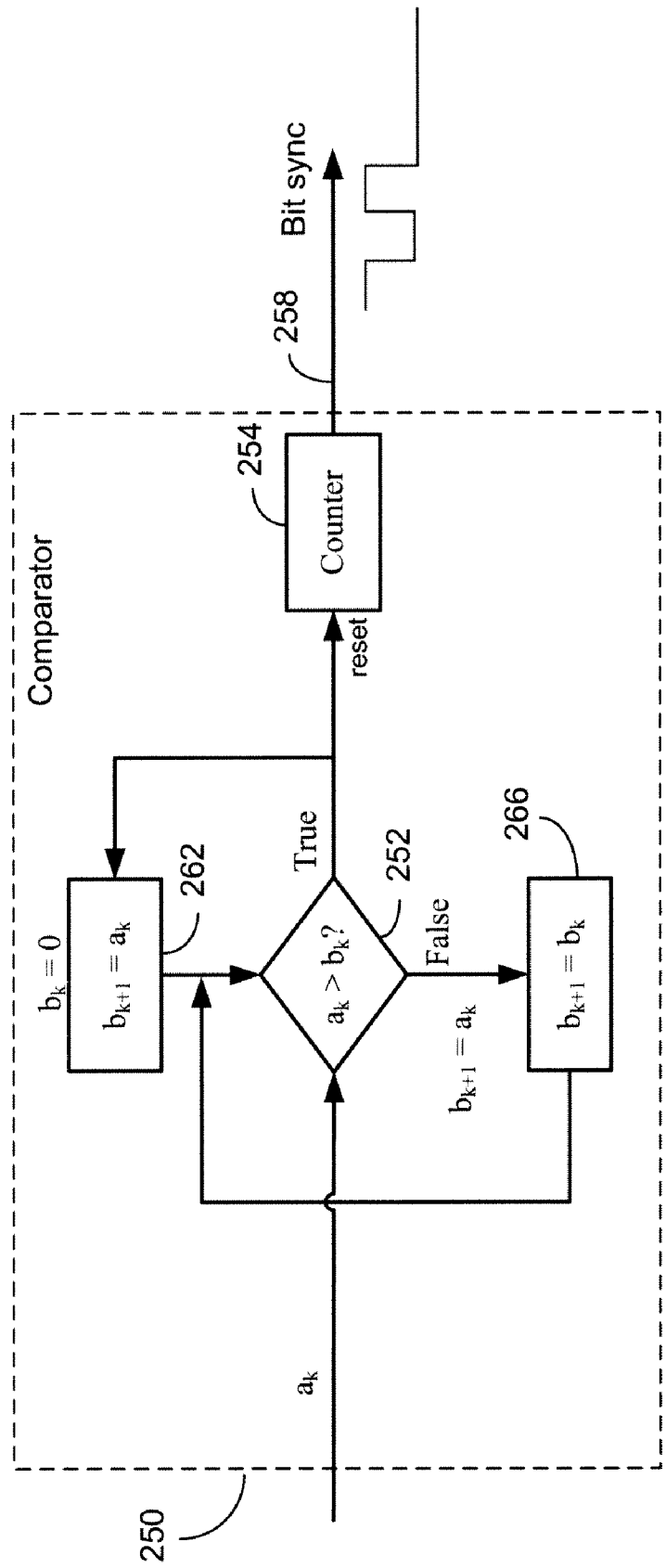
FIG. 5 is a block diagram of an example comparator that may be utilized in the receive chain of FIG. 3.

FIG. 5 is a block diagram of an example comparator 250 that may be utilized for the comparator 144 of FIG. 3. It will be understood, however, that other types of suitable comparators 144 may also be utilized, including known comparators. In FIG. 5, the input $a_k$ to the comparator 250 may correspond to the output of the summing circuit 140 of FIG. 3. The comparator 250 may start with an initial condition $b_k=0$, and the value of $a_k$ will, in most cases be larger than $b_k$. A comparator 252 "true" output will go high when $a_k > b_k$. Since the output of the comparator is coupled to the reset input of a counter 254, the counter output 258 will pulse whenever $a_k > b_k$. The counter output 258 may correspond to the Bit_Sync signal. The next value of b, $b_{k+1}$ is set to the value of $a_k$ at a block 262 and renamed $b_k$.

For the sake of illustration, a next value of $a_k$ is assumed to be smaller than $b_k$. The comparator 252 'false' line will go high and activate a block 266 where $b_k+1$ is set to $b_k$ and used as the next comparison value. The 'true' output will go low and cause the counter 254 to stop counting, leaving the output 258 low. Whenever a new high value of $a_k$ is reached, the 'true' output of the comparator 252 will go high and the counter 254 will output at least one pulse. When the peak value of $a_k$ is reached, all successive samples will be smaller than $b_k$ and the 'true' output of the comparator 252 will no longer go high. Thus, the final pulse on the output 258 will correspond in time with the peak value of the signal, $a_k$. In one embodiment, the counter 254 may run at a 22 MHz rate.

Figure 6:
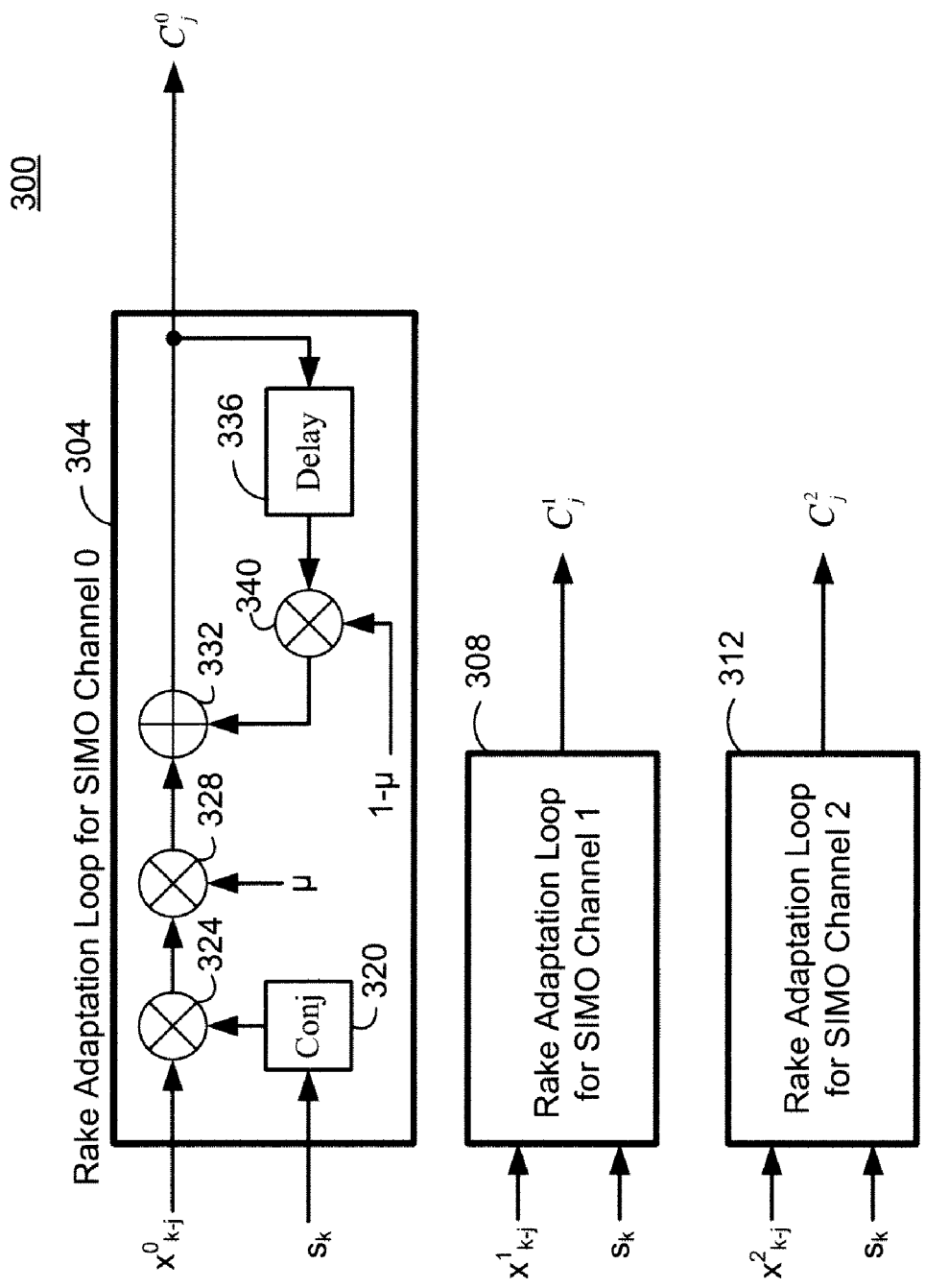
FIG. 6 is a block diagram of an example rake adaptation block that may be utilized with the rake receiver of the receive of FIG. 3.

FIG. 6 is a block diagram of an example rake adaptation block 300 that may be utilized for the rake adaptation block 160 of FIG. 3. It will be understood, however, that other types of suitable rake adaptation blocks 160 may also be utilized, including known rake adaptation blocks. The example rake adaptation block 300 is for a rake receiver having three groups of rake fingers (corresponding to a SIMO Channel 0, a SIMO Channel 1, and a SIMO channel 2). The rake adaptation block 300 includes three rake adaptation loops 304, 308, 312, one corresponding to each SIMO channel, and each rake adaptation loop 304, 308, 312 generates rake receiver coefficients for a corresponding one of the SIMO channels. For example, the rake adaptation loop 304 generates coefficients $C_j^0$ for SIMO Channel 0, where j is a coefficient index. Similarly, the rake adaptation loop 308 generates coefficients $C_j^1$, for SIMO Channel 1, and the rake adaptation loop 312 generates coefficients $C_j^2$ for SIMO Channel 2. Ideally, $C_j^i$ should equal or approximate $(h_j^i)^*$. Each of the rake adaptation loops 304, 308, 312 may receive signals $s_k$ from the demodulator 156 (FIG. 3), where k is a time index. In an embodiment for use with the IEEE 802.11b Standard, the signals $s_k$ from the demodulator 156 may update at a 1 MHz rate. Additionally, each of the rake adaptation loops 304, 308, 312 may receive a correlation signal corresponding to a respective one of the barker correlator outputs 102, 108, 114 (FIG. 3). For example, the rake adaptation loops 304, 308, 312 may receive correlation signals $x_m^0$, $x_m^1$, and $x_m^2$, respectively, where m is a time index corresponding to a rate higher than the rate associated with the signals $s_k$. For example, in one embodiment for use with the IEEE 802.11b standard, the signals $s_k$ from the demodulator 156 may update at a 1 MHz rate, whereas the correlation signals $x_m^0$, and $x_m^1$, and $x_m^2$ may update at a 22 MHz rate.

Although detail is illustrated only for the rake adaptation loop 304, each of the rake adaptation loops 304, 308, 312 may have a similar structure. The rake adaptation loop 304 may include a complex conjugate block 320 and a multiplier 324. The complex conjugate block 320 may receive the signal $s_k$ and may generate its complex conjugate $s_k^*$. For each signal $s_k$ received, the rake adaptation loop 304 may receive a series of correlation values $x_{k-j}^0$, where j=0, 1, ..., L-1, where L is the number of rake coefficients for each SIMO channel. The multiplier 324 may be coupled to the complex conjugate block 320 and may multiply an output of the complex conjugate block 320 by the series of correlation values $x_{k-j}^0$.

An output of the multiplier 324 may be coupled to a multiplier 328, which may multiply the output of the multiplier 324 with an adaptation parameter μ. An output of the multiplier 328 may be coupled to an input of a summing device 332. An output of the summing device 332 is coupled to an input of a symbol delay element 336. In an embodiment for use with the IEEE 802.11b Standard, the delay element 336 may provide a one microsecond delay (i.e., 1/1 MHz). An output of the symbol delay element 336 may be provided to a multiplier 340 that multiplies the output of the delay element 336 by 1−μ. An output of the multiplier 340 is coupled to an input of the adder 332. In operation, the rake adaptation loop 304 generates L coefficients $C_j^0$ for each signal $s_k$. The L coefficients $C_j^0$ are generated in a series, where j varies from 0 to L−1. Similarly, the rake adaptation loop 308 and the rake adaptation loop 312 generate the L coefficients $C_j^1$ and the L coefficients $C_j^2$ in series. The Bit_Sync signal indicates which index j corresponds to the requirement set forth in Equations 1 and 2, for the estimate of the channel reflected by the coefficients $C_j^0$, $C_j^1$ and $C_j^2$ in their current state. Thus, once the coefficients $C_j^0$, $C_j^1$, and $C_j^2$ have adapted adequately, the Bit_Sync signal can be used to select one of each of the coefficients $C_j^0$, $C_j^1$ and $C_j^2$.

Figure 7:
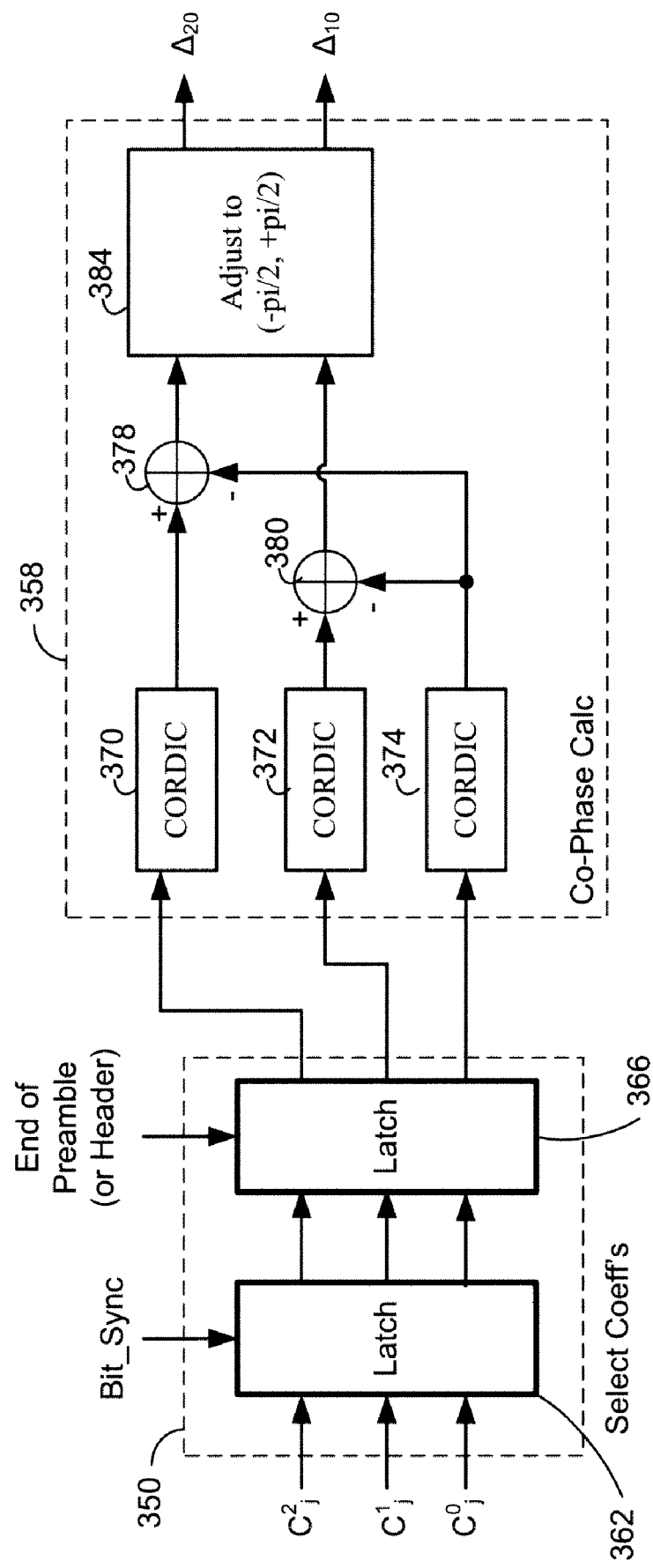
FIG. 7 is a block diagram of an example coefficient selection block coupled to a co-phasing (steering) vector calculation block.

FIG. 7 is a block diagram of an example coefficient selection block 350 coupled to a co-phasing (steering) vector calculation block 358. The coefficient selection block 350 can be utilized as the block 164 (FIG. 3) and/or the block 58 (FIG. 2), for example. It is to be understood, however, that other suitable coefficient selection blocks also may be utilized for the block 164 (FIG. 3) and/or the block 58 (FIG. 2). Similarly, although the steering vector calculation block 358 may be utilized as the block 62 (FIG. 2), it is to be understood that other suitable steering vector calculation blocks also may be utilized.

The coefficient selection block 350 includes a latch 362 coupled to a latch 366. The latch 362 receives rake receiver coefficients $C_j^0$, $C_j^1$ and $C_j^2$ generated by the rake adaptation block 300 (FIG. 6) or some other suitable rake adaptation block. The latch 362 is controlled by the Bit_Sync signal, which generally activates once per symbol period. For example, in an embodiment for use with the IEEE 802.11b Standard, the Bit_Sync signal generally activates once per one microsecond symbol period. The latch 366 is controlled by a signal that indicates when the rake receiver coefficients should be adequately adapted. For example, in an embodiment for use with the IEEE 802.11b Standard, the latch 366 may be controlled by a signal that indicates an end to a received preamble or header. Thus, when the latch 366 is latched, it may store one coefficient from each SIMO channel, and the coefficients stored in the latch 366 may correspond to the requirement of Equations 1 and 2.

An output of the latch 366 may be provided to the steering vector calculation unit 358. The steering vector calculation unit 358 may include a first coordinate rotation digital calculation (CORDIC) block 370, a second CORDIC block 372, and third CORDIC block 374. Each CORDIC block 370, 372, 374 receives a different one of the coefficients from the latch 366, and generates a corresponding angle of the received complex-value coefficient. A subtractor 378 generates a difference between the angle generated by the CORDIC block 370 and the CORDIC block 374. Similarly, a subtractor 380 generates a difference between the angle generated by the CORDIC block 372 and the CORDIC block 374. Outputs of the subtractor 378 and the subtractor 380 are coupled to inputs of a block 384, which fits the angles generated by the subtractor 378 and the subtractor 380 in a specified range, such as −π/2 to +π/2. The block 384 generates two steering vector angle values: $\Delta_{10}$ and $\Delta_{20}$, which generally correspond to phase differences, relative to a first antenna signal, to applied by a transmit steering block to the second and third antenna signals.

Figure 8:
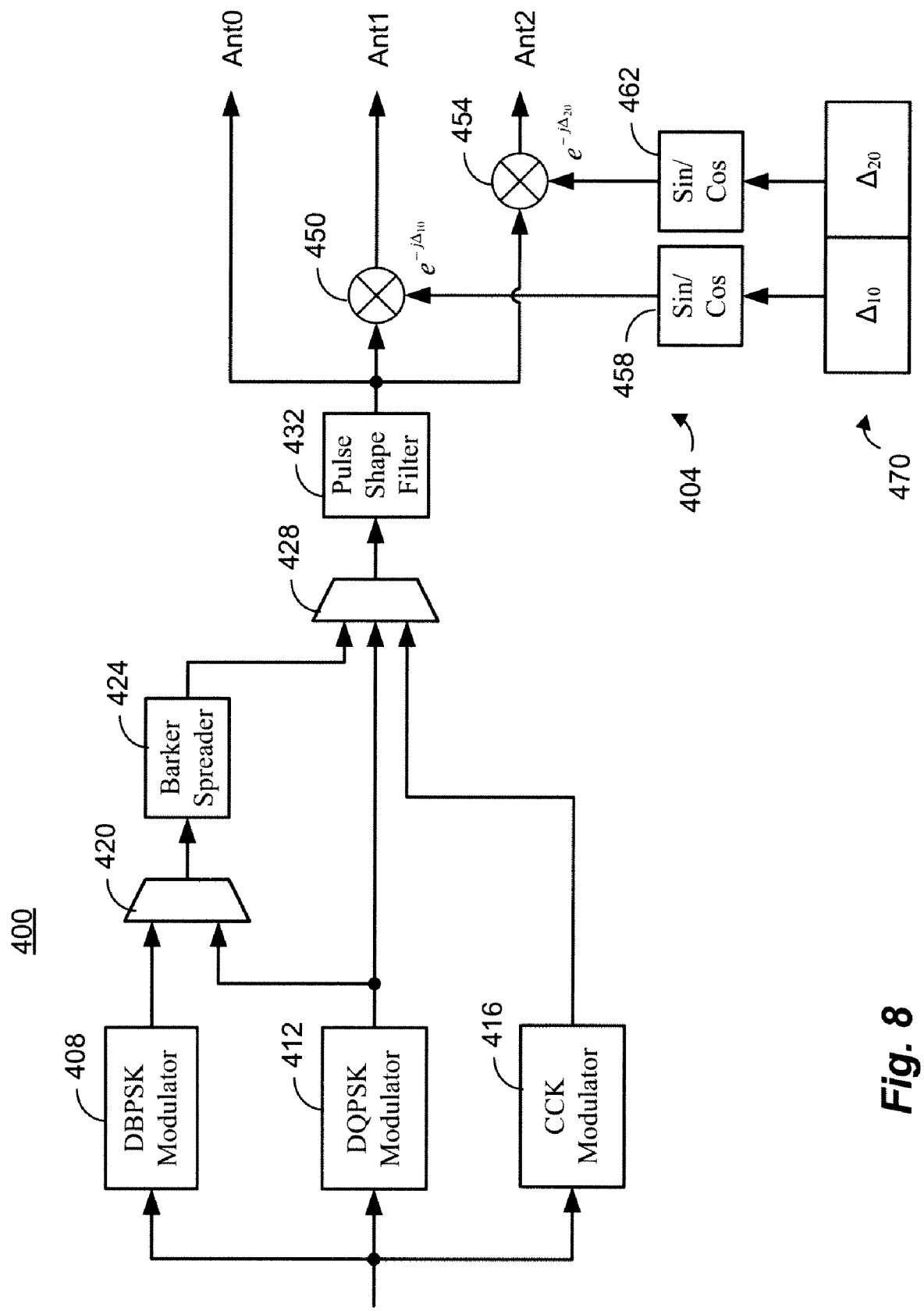
FIG. 8 is a block diagram of a portion of a transmit path that includes a transmit steering block.

FIG. 8 is a block diagram of a portion of a transmit path 400 having a transmit steering block 404. The transmit path 400 and the transmit steering block 404 may correspond to the transmitter 70 and the transmit steering block 74 of FIG. 2, for example. It will be understood, however, that the transceiver 50 of FIG. 2 need not utilize the transmit path 400 and the transmit steering block 404, but instead may utilize other suitable components.

The transmit path 400 is an embodiment for use with the IEEE 802.11b Standard, and includes a differential binary phase shift keying (DBPSK) modulator 408, a differential quadrature phase shift keying (DQPSK) modulator 412, and a complimentary code keying (CCK) modulator 416. As is known, the IEEE 802.11b Standard specifies transmissions at various rates using DBPSK, DQPSK, or CCK modulation.

Thus, a data signal may be coupled to inputs of the DBPSK modulator 408, the DQPSK modulator 412 and the CCK modulator 416. Outputs of the DBPSK modulator 408 and the DQPSK modulator 412 may be coupled to inputs of a multiplexer 420. An output of the multiplexer 420 may be coupled to an input of a barker spreader 424, and an output of the barker spreader 424 may be coupled to a first input of a multiplexer 428. A second input of the multiplexer 428 may be coupled to the output of the DQPSK modulator 412, and a third input of the multiplexer 428 may be coupled to an output of the CCK modulator 416.

An output of the multiplexer 428 may be coupled to an input of a pulse shaping filter 432. An output of the filter 432 may be coupled to the transmit steering block 404. The transmit steering block 404 generally generates first, second and third signals corresponding to three antennas: Antenna 0, Antenna 1 and Antenna 2. The first, second and third signals may be digital signals and thus may be converted to analog signals and further processed and amplified before being provided to the antennas. The first signal may merely be a "pass through" of the output of the filter 432. The second signal may be generated by a multiplier 450, and the third signal may be generated by a multiplier 454. First inputs of the multipliers 450 and 454 may be coupled to the output of the filter 432, and the multipliers 450 and 454 may multiply the output of the filter 432 by complex values $e^{-j\Delta_{10}}$ and $e^{-j\Delta_{20}}$, respectively.

The complex values and $e^{-j\Delta_{10}}$ and $e^{-j\Delta_{20}}$ may be generated by blocks 458 and 462, respectively, based on the values $\Delta_{10}$ and $\Delta_{20}$ stored in a steering vector memory 470. The values $\Delta_{10}$ and $\Delta_{20}$ may be associated with a particular station to which the transmission is destined. For example, the values $\Delta_{10}$ and $\Delta_{20}$ may be associated with a MAC address of the station to which the transmission is destined. Thus, the transmit steering block 404 may retrieve the appropriate values $\Delta_{10}$ and $\Delta_{20}$ from the steering vector memory 470.

In another embodiment, the blocks 450 and 458 may be implemented as a first CORDIC block. Similarly, the blocks 458 and 462 may be implemented as second CORDIC block.

Although in FIG. 8, the transmit steering block 404 is located "downstream" of the filter 432, in other embodiments, the transmit steering block 404 may be located further upstream. For example, the transmit steering block 404 may be located prior to the filter 432. In such an embodiment, separate pulse shaping filters may be utilized on each of the outputs of the transmit steering block 404. In other words, transmit steering could be implemented prior to pulse shape filtering. In another embodiment, both barker spreading (block 424) and pulse shape filtering (432) may be performed after transmit steering.

The embodiments described with reference to FIGS. 3-8 generally relate to selecting one channel coefficient index from each SIMO channel such that the requirement of Equation 1 is met. As described previously, other embodiments may select one channel coefficient index from each SIMO channel such that the requirement of Equation 3 is met. In one such embodiment, selecting one coefficient from each SIMO channel estimate to meet the requirement of Equation 3 may include generating additional Bit_Sync signals. In particular, separate Bit_Sync signals for each of the SIMO channel estimate may be additionally generated.

Figure 9:
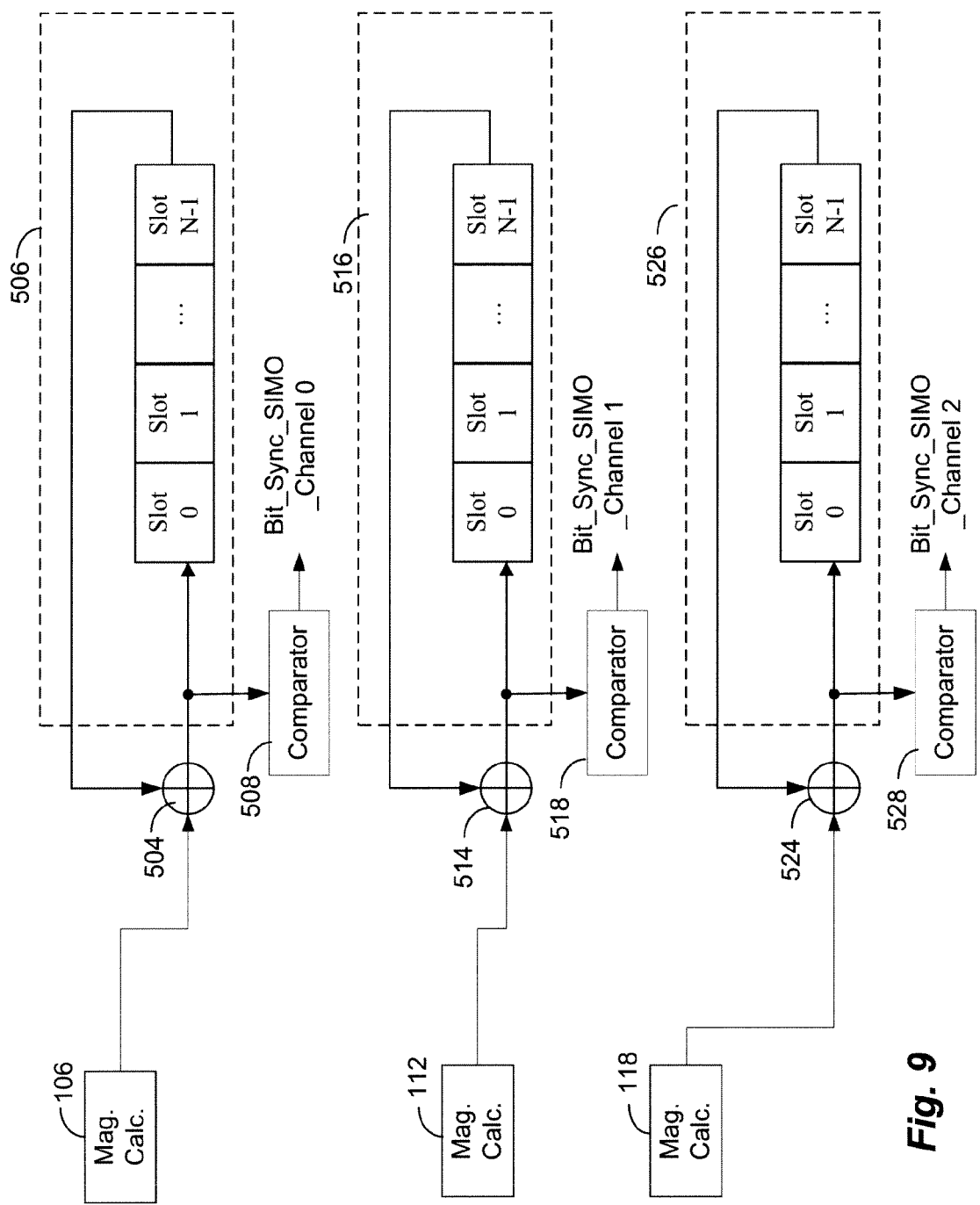
FIG. 9 is a block diagram of an embodiment of circuitry for generating Bit_Sync signals.

Referring now to FIG. 9, an embodiment of additional Bit_Sync signal generation circuitry is illustrated. The additional circuitry is similar to the summing circuit 140, the register circuit 124, and the comparator 144 used to generate the Bit_Sync signal as described with reference to FIG. 3. But instead of generating the Bit_Sync signal based on the summation of the outputs of the three magnitude calculators 106, 112, 118, three separate additional Bit_Sync signals are generated based on the separate outputs of the magnitude calculators 106, 112, 118.

For example, a Bit_Sync_SIMO_Channel0 signal is generated based on the output of the magnitude calculator 106. The magnitude calculator 106 is coupled to an input of a summing circuit 504. Another input of the summing circuit 504 is coupled to an output of a register circuit 506. An output of the summing circuit 504 is coupled to an input of the register circuit 506. The output of the summing circuit 504 is also coupled to an input of a comparator 508. The register circuit 506 and the comparator 508 may be the same as or similar to the register circuit 124 and the comparator 144 of FIG. 3. In operation, the summing circuit 504, the register circuit 506, and the comparator 508 may operate to generate the Bit_Sync_SIMO_Channel0 signal in a manner similar to the generation of the Bit_Sync signal described with reference to FIG. 3.

A Bit_Sync_SIMO_Channel1 signal is generated based on the output of the magnitude calculator 112. The magnitude calculator 112 is coupled to an input of a summing circuit 514. Another input of the summing circuit 514 is coupled to an output of a register circuit 516. An output of the summing circuit 514 is coupled to an input of the register circuit 516. The output of the summing circuit 514 is also coupled to an input of a comparator 518. The register circuit 516 and the comparator 518 may be the same as or similar to the register circuit 124 and the comparator 144 of FIG. 3. In operation, the summing circuit 514, the register circuit 516, and the comparator 518 may operate to generate the Bit_Sync_SIMO_Channel1 signal in a manner similar to the generation of the Bit_Sync signal described with reference to FIG. 3.

A Bit_Sync_SIMO_Channel2 signal is generated based on the output of the magnitude calculator 118. The magnitude calculator 118 is coupled to an input of a summing circuit 524. Another input of the summing circuit 524 is coupled to an output of a register circuit 526. An output of the summing circuit 524 is coupled to an input of the register circuit 526. The output of the summing circuit 524 is also coupled to an input of a comparator 528. The register circuit 526 and the comparator 528 may be the same as or similar to the register circuit 124 and the comparator 144 of FIG. 3. In operation, the summing circuit 524, the register circuit 526, and the comparator 528 may operate to generate the Bit_Sync_SIMO_Channel2 signal in a manner similar to the generation of the Bit_Sync signal described with reference to FIG. 3.

Figure 10:
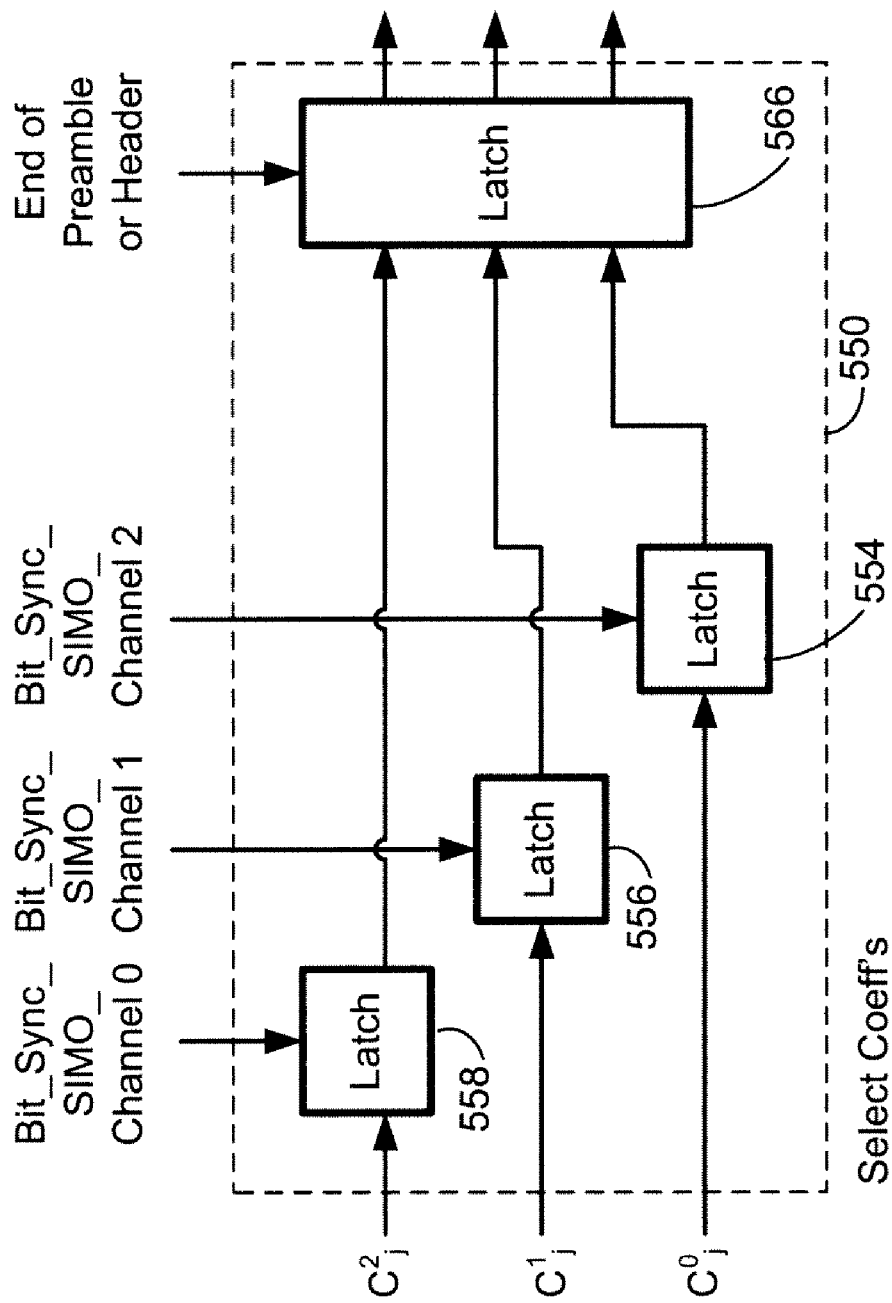
FIG. 10 is a block diagram of another example coefficient selection block.

The separate, additional Bit_Sync signals may be utilized to select coefficients that meet the requirement of Equation 3 in a manner that is similar to the description above associated with FIG. 7. FIG. 10 is a block diagram of an example coefficient selection block 550, which may be coupled to a co-phasing (steering) vector calculation block such as the co-phasing (steering) vector calculation block 358 of FIG. 7. The coefficient selection block 550 can be utilized as the block 164 (FIG. 3) and/or the block 58 (FIG. 2), for example. It is to be understood, however, that other suitable coefficient selection blocks also may be utilized for the block 164 (FIG. 3) and/or the block 58 (FIG. 2).

The coefficient selection block 550 includes a latch 554, a latch 556, and a latch 558, each coupled to a latch 566. The latch 554 receives rake receiver coefficients $C_j^0$ generated by the rake adaptation block 300 (FIG. 6) or some other suitable rake adaptation block. Similarly, the latch 556 receives rake receiver coefficients $C_j^1$. Also, the latch 558 receives rake receiver coefficients $C_j^2$. The latch 354 is controlled by the Bit_Sync_SIMO_Channel0 signal. Similarly, the latch 356 is controlled by the Bit_Sync_SIMO_Channel1 signal, and the latch 358 is controlled by the Bit_Sync_SIMO_Channel2 signal. Each of the Bit_Sync_SIMO_Channel0, Bit_Sync_SIMO_Channel1, and Bit_Sync_SIMO_Channel2 signals generally activates once per symbol period. For example, in an embodiment for use with the IEEE 802.11b Standard, each of the Bit_Sync_SIMO_Channel0, Bit_Sync_SIMO_Channel1, and Bit_Sync_SIMO_Channel2 signals generally activates once per one microsecond symbol period. The latch 566 is controlled by a signal that indicates when the rake receiver coefficients should be adequately adapted. For example, in an embodiment for use with the IEEE 802.11b Standard, the latch 566 may be controlled by a signal that indicates an end to a received preamble or header. Thus, when the latch 566 is latched, it may store one coefficient from each SIMO channel estimate, and the coefficients stored in the latch 566 may correspond to the requirement of Equations 3 and 4.

Figure 11:
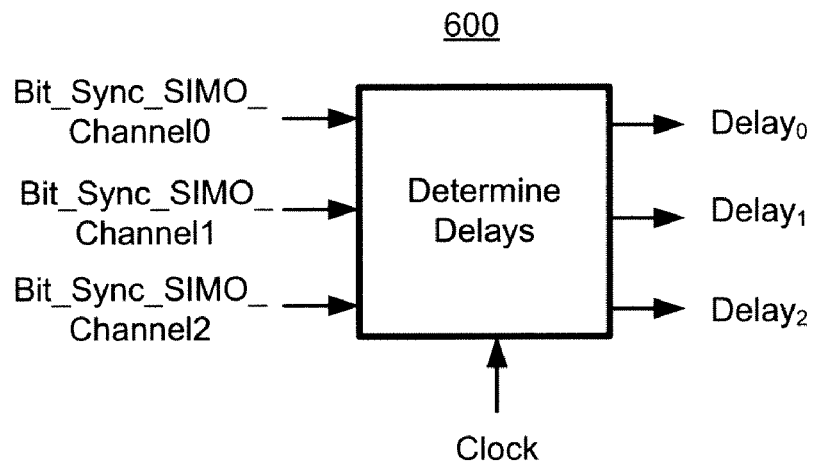
FIG. 11 is a block diagram of a delay calculation block for calculating transmit steering delays.

To implement transmit steering with the coefficients selected to meet the requirement of Equation 3, the transmit steering block may implement a delay on each of the antenna signals. FIG. 11 is a block diagram of a delay calculation block 600 for calculating the delays. The block 600 may receive the Bit_Sync_SIMO_Channel0, Bit_Sync_SIMO_Channel1, and Bit_Sync_SIMO_Channel2 signals. Additionally, the block 600 may receive a clock signal. The block 600 may generate a delay value for each of the Bit_Sync_SIMO_Channel0, Bit_Sync_SIMO_Channel1, and Bit_Sync_SIMO_Channel2 signals, measured by the clock signal. The delays may be measured with reference to the first occurring of the Bit_Sync_SIMO_Channel0, Bit_Sync_SIMO_Channel1, and Bit_Sync_SIMO_Channel2 signals. Thus, in this embodiment, one of the calculated delays optionally may be set to zero. The calculated delays ($Delay_0$, $Delay_1$, $Delay_2$) may be stored in a steering vector memory in a manner similar to that described above with respect to the steering vector angle information. The block 600 may be implemented by logic circuitry, for example.

Figure 12:
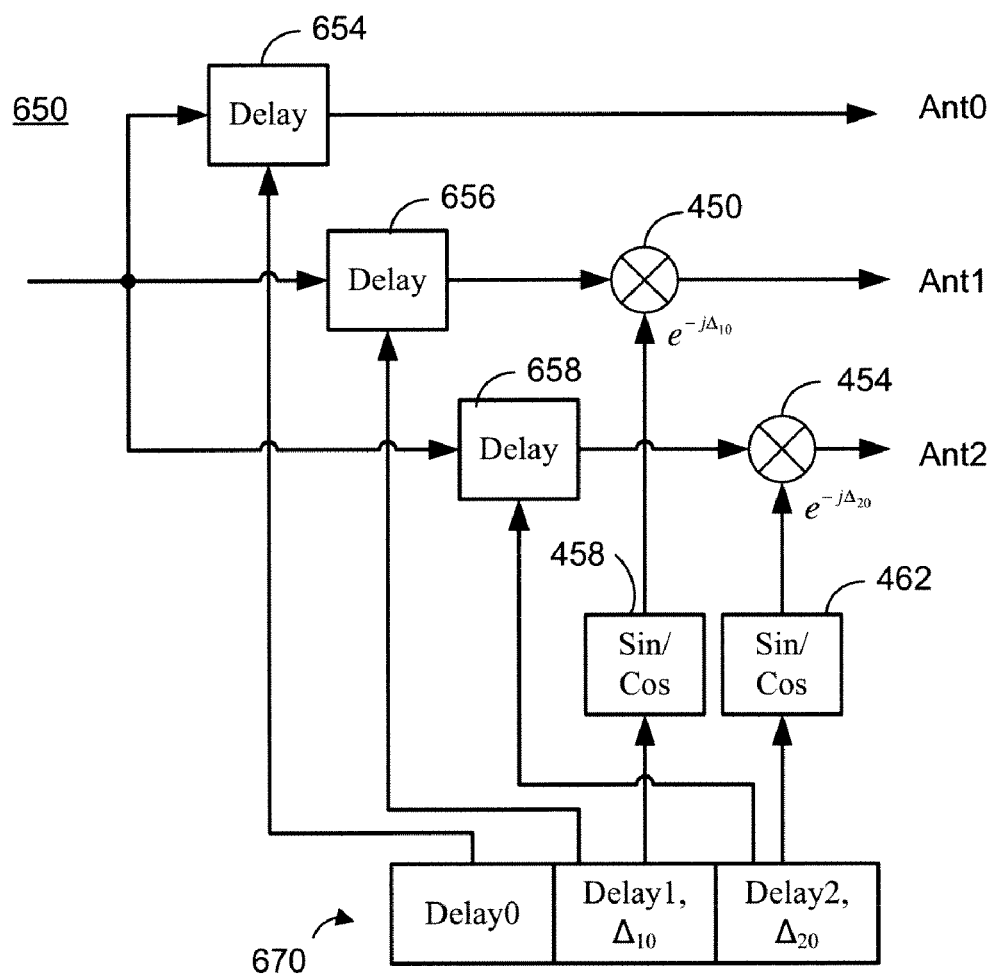
FIG. 12 is a block diagram of another example transmit steering block.

FIG. 12 is a block diagram of an example transmit steering block 650 for use with a system that selects rake receiver coefficients to meet the requirement of Equation 3. The transmit steering block 650 is similar to the transmit steering block 404 of FIG. 8, and may include like-numbered elements. Additionally, the transmit steering block 650 includes delay elements 654, 656, and 658. The delay elements 654, 656, and 658 implement delays as specified by delay information $Delay_0$, $Delay_1$, $Delay_2$ stored in a memory 670. Although the delay elements 656 and 658 are illustrated in FIG. 12 as being "upstream" from the multipliers 450 and 454, in another embodiment, the delay elements 656 and 658 may be located downstream from the multipliers 450 and 454.

Figure 13:
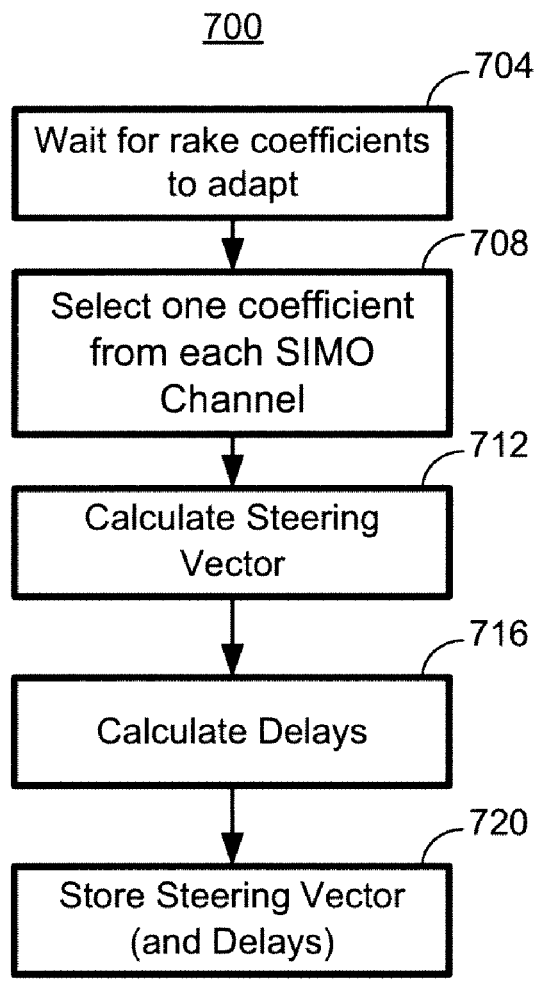
FIG. 13 is a flow diagram of an example method for generating a transmit steering vector.

FIG. 13 is a flow diagram of an example method 700 for generating a transmit steering vector. The method 700 may be implemented by a multiple antenna transceiver such as the example transceiver 50 of FIG. 2, or some other suitable transceiver. The method 700 may also be implemented by embodiments of apparatuses described with respect to at least some of FIGS. 3-12. For ease of explanation, the method 700 will be described with respect to some of FIGS. 2-12. It is to be understood, however, that the method 700 may be implemented by apparatuses other than those described with reference to FIGS. 2-12.

The method 700 may be implemented upon receiving a signal from a single antenna transceiver for which it is desired to calculate a transmit steering vector. At a block 704, the rake receiver coefficients may be allowed to adapt in response to receiving the signal from the single antenna station. In an embodiment for use with the IEEE 802.11b standard, the rake receiver coefficients may be allowed to adapt until a preamble or a header has been completely received, for example. Referring to FIG. 7, for example, a signal indicating the end of a preamble had been received may be used to determine when the rake receiver coefficients have adequately adapted. In other embodiments, the rake receiver coefficients may be allowed to adapt from some period of time, until an error level or error rate reaches a specified level, etc. Referring to FIG. 2, waiting for the rake coefficients to adapt may be implemented by the block 54 and/or the block 58.

At a block 708, one coefficient from each SIMO Channel may be selected. Selecting the coefficients may include selecting coefficients such that the requirement of Equation 1 is satisfied. In one embodiment, selecting coefficients may include generating a Bit_Sync signal such as described with reference to FIGS. 3 and 5, and selecting coefficients based on the Bit_Sync signal such as described with reference to FIGS. 6 and 7. Alternatively, selecting coefficients may include selecting coefficients such that the requirement of Equation 3 is satisfied. In one embodiment, selecting coefficients may include generating multiple Bit_Sync signals such as described with reference to FIG. 9, and selecting coefficients based on the multiple Bit_Sync signals such as described with reference to FIG. 10. Referring to FIG. 2, selecting coefficients may be implemented by the block 58.

At a block 716, a steering vector may be calculated based on the coefficients selected at the block 708. In one embodiment, calculating the steering vector may include calculating the steering vector as described with reference to FIG. 7. Referring to FIG. 2, calculating the steering vector may be implemented by the block 62.

Optionally, at a block 716, transmit steering delays may be calculated. For example, if coefficients are selected at the block 708 such that the requirement of Equation 3 is satisfied, transmit steering delays may be calculated based on the selected coefficients. Referring to FIG. 11, transmit steering delays may be calculated by the block 600 in one embodiment.

At a block 720, the calculated steering vector may be stored in a memory, such as the transmit steering memory 74 of FIG. 2, the memory 470 of FIG. 8, etc. If transmit steering delays are also generated, the delays also may be stored at the block 720, such as by storing the delays in the transmit steering memory 74 of FIG. 2, the transmit steering memory 670 of FIG. 12, etc. The stored steering vector (and optionally the delays) may be associated with an identifier of the single antenna station to which the steering vector (and optionally the delays) correspond. For example, the location to which the steering vector is stored may be associated with the identifier. Thus, when the steering vector is needed for transmit steering to the single antenna station, the transceiver may be able to locate the steering vector in the memory using the identifier. In one embodiment, the identifier may be a MAC address of the single antenna station. Of course, many other suitable identifiers may also be utilized.

Figure 14:
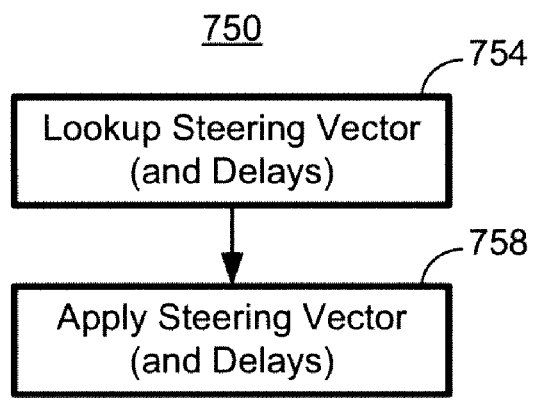
FIG. 14 is a flow diagram of an example method that may be utilized by a multiple antenna transceiver when it is to transmit to a single antenna station.

After the transmit steering vector has been stored (and optionally after the transmit steering delays have been stored), the multiple antenna transceiver may be able to utilize the steering vector (and optionally the delays) to steer transmissions to the single antenna station. FIG. 14 is a flow diagram of an example method 750 that may be utilized by a multiple antenna transceiver when it is to transmit to a single antenna station. The method 750 may be implemented by a multiple antenna transceiver such as the example transceiver 50 of FIG. 2, or some other suitable transceiver. The method 750 may also be implemented by the embodiments described with respect to FIGS. 8 and 12. For ease of explanation, the method 750 will be described with respect to some of FIGS. 2, 8 and 12. It is to be understood, however, that the method 750 may be implemented by apparatuses other than those described with reference to FIGS. 2, 8 and 12.

The method 750 may be implemented after the method 700 has been implemented and, thus, a transmit steering vector (and optionally transmit steering delays) have been stored in a memory and associated with a single antenna transceiver. At a block 754, a steering vector associated with a single antenna transceiver to which a signal is to be transmitted is looked up in a steering vector memory. For example, a location of the steering vector may be determined based on an identifier, such as a MAC address, of the single antenna transceiver. Optionally, steering delays also may be located, if they have been calculated. The steering vector (and optionally the steering delays) may be looked up in a memory such as the transmit steering memory 66 of FIG. 2, the memory 470 of FIG. 8, or the memory 670 of FIG. 12.

At a block 758, the steering vector located at the block 754 may be applied to the signal that is to be transmitted to the single antenna transceiver. Optionally, the transmit steering delays also may be applied. The steering vector may be applied by a steering block such as the block 74 of FIG. 2, the block 404 of FIG. 8, or the block 650 of FIG. 12. If steering delays are to be applied, the steering delays may be applied by a steering block such as the block 74 of FIG. 2 or the block 650 of FIG. 12.

In some embodiments, a transceiver may be capable of operating according to multiple standards. For example, a transceiver may be capable of operating according to the IEEE 802.11b Standard, as well as one or more of the IEEE 802.11a Standard, the IEEE 802.11g Standard, and the IEEE 802.11n Standard. In such an embodiment, the transceiver may include blocks for calculating and storing steering vectors related to OFDM transmissions. For instance, a steering vector may be calculated for each OFDM sub-carrier. Also, storage for the multiple steering vectors for multiple OFDM sub-carriers may be provided. In such embodiments, the OFDM-related steering vector calculation and storage may be reused or duplicated for use in transmit steering for single carrier IEEE 802.11b Standard transmissions. Referring to FIG. 7, for example, the steering vector calculation block 358, or a similar block, could be reused or duplicated from OFDM-related steering vector calculation. Referring to FIGS. 2, 8, and 12, the steering vector memories 66, 470, and 670 could be reused or duplicated from OFDM-related steering vector memory.

If OFDM-related steering vector memory is reused, a portion of the OFDM-related steering vector memory may be reserved for use with IEEE 802.11b Standard transmissions. For example, respective portions of the steering vector memory may be associated with different MAC addresses of transceivers. Also, a MAC addresses may be flagged as being associated with an IEEE 802.11b transceiver. Thus, steering memory portions associated with an IEEE 802.11b a MAC address may not be used for OFDM-related steering vector storage.

The transmit steering techniques described above may be utilized in various multiple-antenna devices that transmit using a single-carrier modulation scheme such as specified in the IEEE 802.11b Standard. For example, the transmit steering techniques described above may be utilized in base stations, access points, wireless routers, etc. Additionally, FIGS. 15A-15F illustrate various devices in which transmit steering techniques for multiple antenna transceivers, such as described above, may be employed.

Figure 15A:
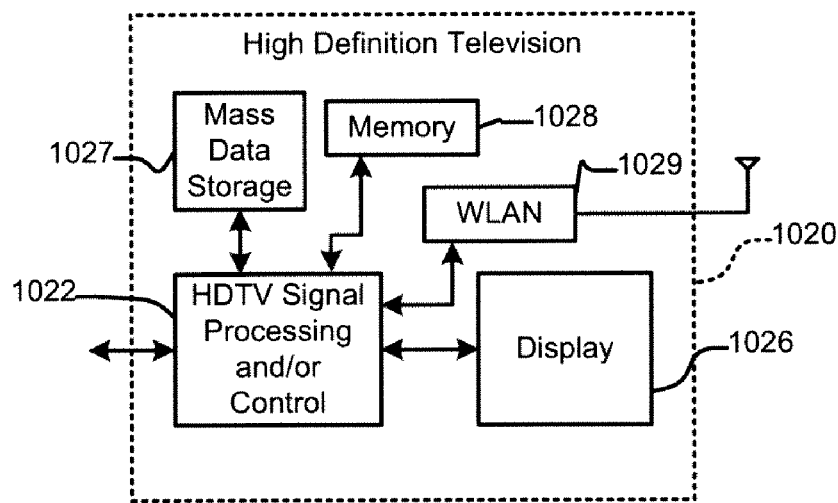
FIG. 15A is a block diagram of a high definition television that may utilize transmit steering techniques such as described herein.

Referring now to FIG. 15A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement transmit steering techniques such as described above.

Figure 15B:
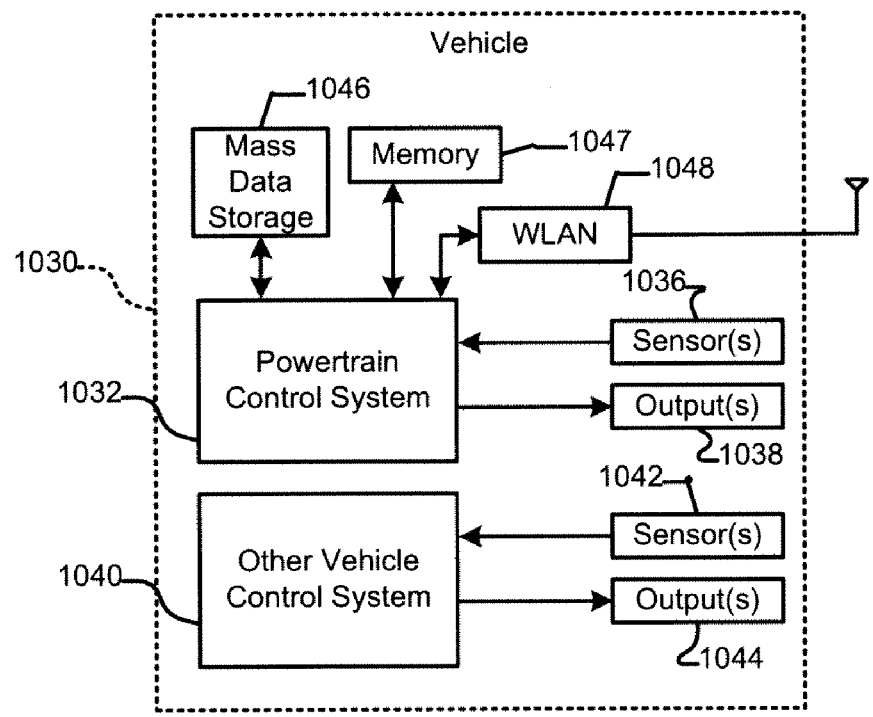
FIG. 15B is a block diagram of a vehicle that may utilize transmit steering techniques such as described herein.

Referring now to FIG. 15B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement transmit steering techniques such as described above.

Figure 15C:
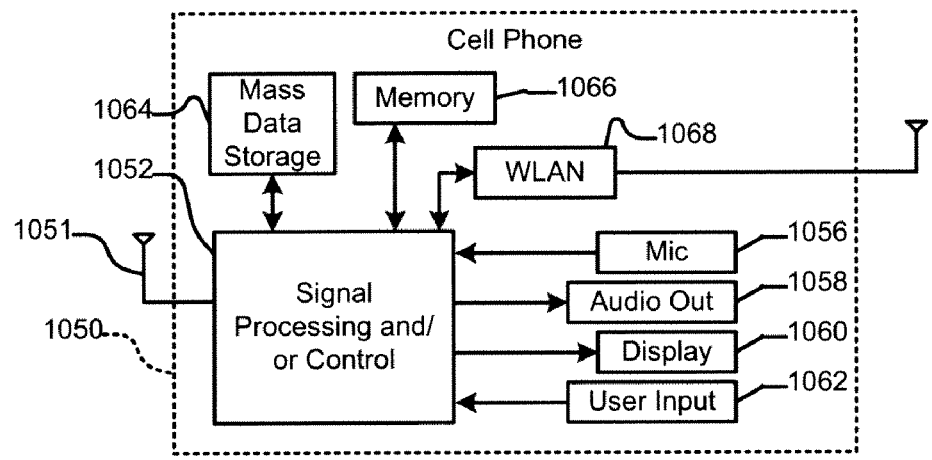
FIG. 15C is a block diagram of a cellular phone that may utilize transmit steering techniques such as described herein.

Referring now to FIG. 15C, such techniques may be used in a cellular phone 1050 that may include a cellular antenna 1051. The cellular phone 1050 may include either or both signal processing and/or control circuits, which are generally identified in FIG. 15C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement transmit steering techniques such as described above.

Figure 15D:
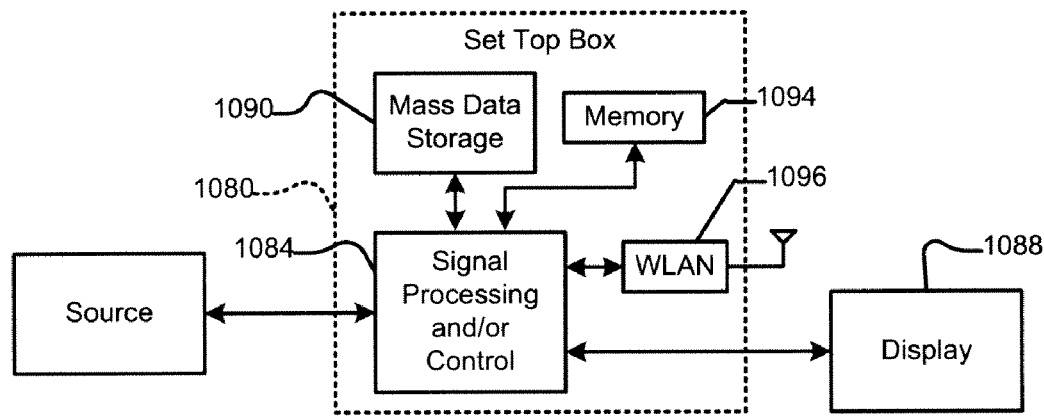
FIG. 15D is a block diagram of a set top box that may utilize transmit steering techniques such as described herein.

Referring now to FIG. 15D, such techniques may be utilized in a set top box 1080. The set top box 1080 may include either or both signal processing and/or control circuits, which are generally identified in FIG. 15D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement transmit steering techniques such as described above.

Figure 15E:
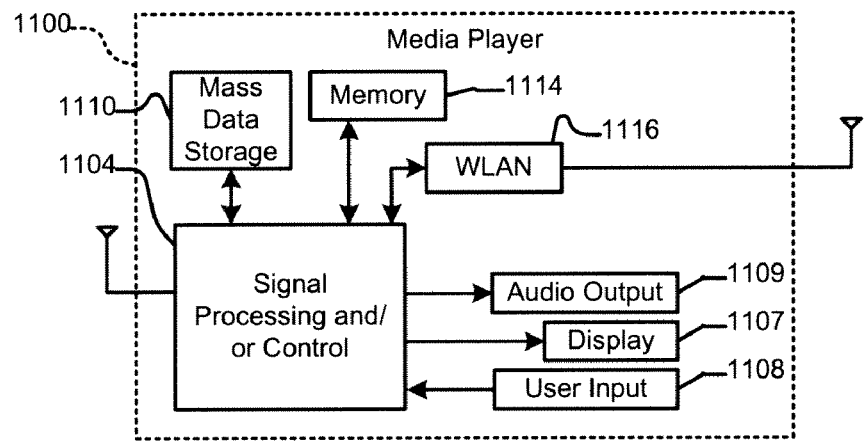
FIG. 15E is a block diagram of a media player that may utilize transmit steering techniques such as described herein.

Referring now to FIG. 15E, such techniques may be used in a media player 1100. The media player 1100 may include either or both signal processing and/or control circuits, which are generally identified in FIG. 15E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement transmit steering techniques such as described above.

Figure 15F:
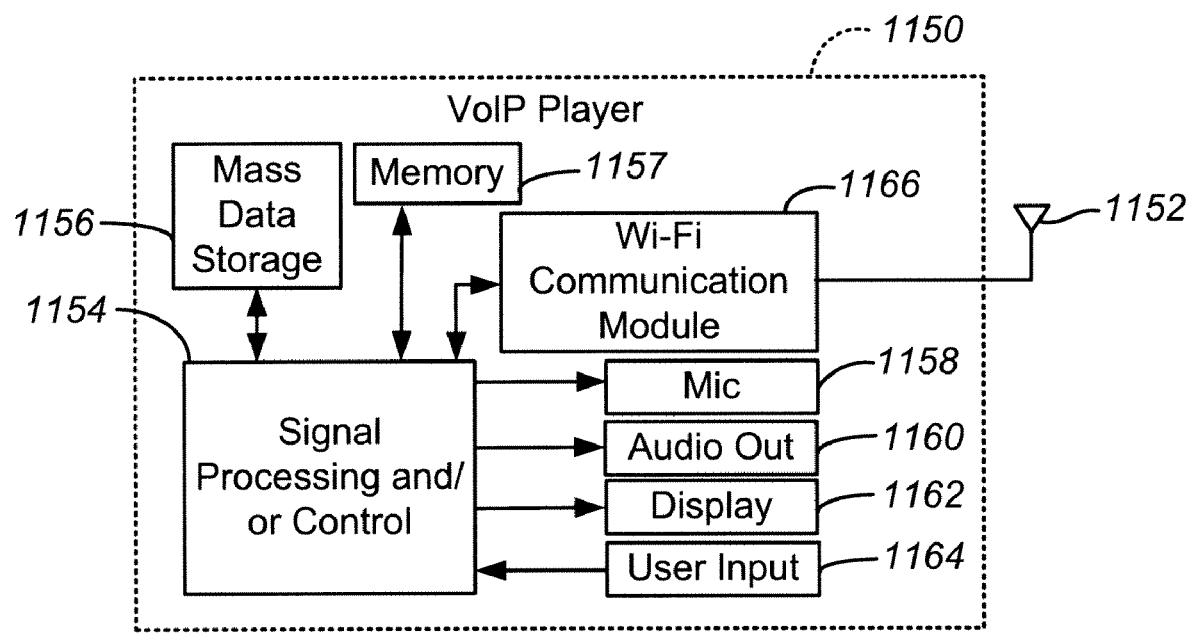
FIG. 15F is a block diagram of a voice over IP device that may utilize transmit steering techniques such as described herein.

Referring to FIG. 15F, such techniques may be utilized in a Voice over Internet Protocol (VoIP) phone 1150 that may include an antenna 1152. The VoIP phone 1150 may include either or both signal processing and/or control circuits, which are generally identified in FIG. 15F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement transmit steering techniques such as described above.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
adapting a rake receiver having a plurality of rake fingers based on a plurality of received signals, wherein the plurality of received signals correspond to a single signal i) transmitted by a single antenna transceiver, and ii) received by a multiple antenna transceiver that includes the rake receiver, wherein each of a plurality of groups of rake fingers corresponds to a single-input, multiple output (SIMO) channel estimate;
selecting one coefficient from each of the plurality of SIMO channel estimates according to one of i) $\max_{l} \sum_{i=0}^{R-1} |h_l^i|$ or ii) $\sum_{i=1}^{R} \max_{l} |h_l^i|$, wherein $h_l^i$ are SIMO channel coefficients corresponding to an estimate of an $i^{th}$ SIMO channel between a respective one of the antennas of the multiple antenna transceiver and the single antenna transceiver, wherein l varies between 0 and L−1, wherein R is a number of SIMO channels, and wherein L is a number of coefficients in each of the SIMO channel estimates;
generating a transmit steering vector based on the selected coefficients; and
applying the transmit steering vector to a signal to be transmitted by the multiple antenna transceiver to the single antenna transceiver.

2. A method according to claim 1, further comprising:
detecting an end of a preamble in the single signal;
selecting one coefficient from each of the plurality of SIMO channel estimates after the end of the preamble is detected.

3. A method according to claim 1, further comprising:
detecting an end of a header in the single signal;
selecting one coefficient from each of the plurality of SIMO channel estimates after the end of the header is detected.

4. A method according to claim 1, wherein
selecting one coefficient from each of the plurality of SIMO channel estimates comprises selecting one coefficient from each of the plurality of SIMO channel estimates according to $\max_{l} \sum_{i=0}^{R-1} |h_l^i|$, and the method further comprises:
generating a plurality of correlation signals based on correlating each of the plurality of received signals with a barker sequence;
calculating respective magnitude signals based on the plurality of correlation signals;
combining the magnitude signals; and
generating a bit synchronization signal based on the combined magnitude signals;
wherein selecting one coefficient from each of the plurality of SIMO channel estimates comprises selecting one coefficient from each of the plurality of SIMO channel estimates based on the bit synchronization signal.

5. A method according to claim 4, wherein the combined magnitude signal includes a plurality of slots for every symbol period;
wherein the method further comprises processing the combined magnitude signal by adding corresponding slots over multiple symbol periods;
wherein generating the bit synchronization signal is based on the processed combined magnitude signal.
wherein selecting one coefficient from each of the plurality of SIMO channel estimates comprises selecting one coefficient from each of the plurality of SIMO channel estimates based on the bit synchronization signal.

6. A method according to claim 1, wherein
selecting one coefficient from each of the plurality of SIMO channel estimates comprises selecting one coefficient from each of the plurality of SIMO channel estimates according to $\sum_{i=1}^{R-1} \max_{l} |h_l^i|$, and the method further comprises:
generating a plurality of correlation signals based on correlating each of the plurality of received signals with a barker sequence;
calculating respective magnitude signals based on the plurality of correlation signals;
generating respective bit synchronization signals based on the respective magnitude signals;
wherein selecting one coefficient from each of the plurality of SIMO channel estimates comprises selecting one coefficient from each of the plurality of SIMO channel estimates based on the bit synchronization signals.

7. A method according to claim 6, wherein each respective magnitude signal includes a plurality of slots for every symbol period;
wherein the method further comprises processing each of the magnitude signals by adding corresponding slots over multiple symbol periods;
wherein generating the bit synchronization signals is based on the processed magnitude signals.

8. A method according to claim 1, further comprising:
generating transmit steering delays based on the selected coefficients; and applying the transmit steering delays to the signal to be transmitted by the multiple antenna transceiver to the single antenna transceiver.

9. A method according to claim 1, further comprising:
storing the transmit steering vector in a memory; and
retrieving the transmit steering from the memory prior to applying the transmit steering vector.

10. An apparatus, comprising:
a rake receiver having a plurality of groups of rake fingers corresponding to a plurality of single-input, multiple output (SIMO) channel estimates, wherein the SIMO channel estimates correspond to a plurality of SIMO channels between a multiple antenna transceiver and a single antenna transceiver;
a coefficient selection unit coupled to the rake receiver, the coefficient selection unit configured to select one coefficient from each of the plurality of SIMO channel estimates according to one of i)

i) $\max_l \sum_{i=0}^{R-1} |h_l^i|$ or ii) $\sum_{i=1}^{R} \max_l |h_l^i|$, wherein $h_l^i$ are SIMO channel coefficients corresponding to an estimate of an $i^{th}$ SIMO channel wherein l varies between 0 and L−1, wherein R is a number of SIMO channels, and wherein L is a number of coefficients in each of the SIMO channel estimates;
a transmit steering vector calculation unit coupled to the coefficient selection unit; and
a transmit steering unit to apply the transmit steering vector to a signal to be transmitted by the multiple antenna transceiver.

11. An apparatus according to claim 10, wherein the coefficient selection unit is configured to select one coefficient from each of the plurality of SIMO channel estimates after the end of a received preamble is detected.

12. An apparatus according to claim 10, wherein the coefficient selection unit is configured to select one coefficient from each of the plurality of SIMO channel estimates after the end of a received header is detected.

13. An apparatus according to claim 10, wherein
the coefficient selection unit is configured to select one coefficient from each of the plurality of SIMO channel estimates according to $\max_l \sum_{i=0}^{R-1} |h_l^i|$, and the apparatus further comprises:
a plurality of correlators to generate a plurality of correlation signals based on correlating each of a plurality of signals with a barker sequence, wherein each signal of the plurality of signals corresponds to a single transmitted by the single antenna transceiver and received by a respective antenna of the multiple antenna tranceiver;
a plurality of magnitude calculators coupled to the plurality of correlators to calculate a plurality of magnitude signals based on the plurality of correlation signals;
a first summation device coupled to the plurality of magnitude calculators to combine the plurality of magnitude signals; and
a comparator coupled to the first summation device to generate a bit synchronization signal based on an output of the first summation device;
wherein the coefficient selection unit is configured to select one coefficient from each of the plurality of SIMO channel estimates based on the bit synchronization signal.

14. An apparatus according to claim 13, further comprises:
a second summation device coupled to the first summation device;
a register circuit coupled to the second summation device;
wherein the output of the first summation device includes a plurality of slots for every symbol period;
wherein the second summation device and the register circuit are arranged to combine corresponding slots over multiple symbol periods;
wherein the comparator is coupled to an output of the second summation device.

15. An apparatus according to claim 10, wherein
the coefficient selection unit is configured to select one coefficient from each of the plurality of SIMO channel estimates according to $\max_l \sum_{i=0}^{R-1} |h_l^i|$, and the apparatus further comprises:
a plurality of correlators to generate a plurality of correlation signals based on correlating each of a plurality of signals with a barker sequence, wherein each signal of the plurality of signals corresponds to a single signal transmitted by the single antenna transceiver and received by a respective antenna of the multiple antenna transceiver;
a plurality of magnitude calculators coupled to the plurality of correlators to calculate a plurality of magnitude signals based on the plurality of correlation signals; and
a plurality of comparators coupled to the plurality of magnitude calculators to generate a plurality of bit synchronization signals based on outputs of the plurality of magnitude calculators;
wherein the coefficient selection unit is configured to select one coefficient from each of the plurality of SIMO channel estimates based on the plurality of bit synchronization signals.

16. An apparatus according to claim 15, further comprising:
a plurality of summation devices coupled to the plurality of magnitude calculators;
a plurality of register circuits coupled to the plurality of summation devices;
wherein the respective outputs of the plurality of summation devices each includes a plurality of respective slots for every symbol period;
wherein the plurality of summation devices and the plurality of register circuits are arranged to combine corresponding slots over multiple symbol periods for each output of the plurality of magnitude calculators;
wherein the plurality of comparators are coupled to outputs of the plurality of summation devices.

17. An apparatus according to claim 10, further comprising:
- a transmit steering delay calculator coupled to the coefficient selection unit; and
- wherein the transmit steering unit is configured to apply transmit steering delays to the signal to be transmitted by the multiple antenna transceiver.

18. An apparatus according to claim 10, further comprising:
- a transmit steering vector memory;
- wherein the transmit steering calculation unit is coupled to the transmit steering vector memory; and
- wherein the transmit steering unit is coupled to the transmit steering vector memory.

19. A method, comprising:
- receiving via a plurality of single input, multiple output (SIMO) channels a signal from a single antenna transceiver;
- adapting a rake receiver based on the received signal, wherein the rake receiver includes a group of rake fingers for each of the SIMO channels, wherein each group of rake fingers corresponds to a SIMO channel estimate;
- selecting one coefficient from each of the SIMO channel estimates according to one of i)

$$\text{i) } \max_l \sum_{i=0}^{R-1} |h_l^i| \text{ or ii) } \sum_{i=1}^{R} \max_l |h_l^i|,$$

wherein $h_l^i$ are SIMO channel coefficients corresponding to an estimate of an $i^{th}$ SIMO channel, wherein l varies between 0 and L−1, wherein R is a number of SIMO channels, and wherein L is a number of coefficients in each of the SIMO channel estimates;
- generating a transmit steering vector based on the selected coefficients;
- storing the transmit steering vector in a memory segment associated with the single antenna transceiver;
- retrieving the steering vector from the memory segment; and
- applying the transmit steering vector to a signal to be transmitted from a multiple antenna transceiver to the single antenna transceiver.

20. An apparatus, comprising:
- a plurality of correlators to generate a plurality of correlation signals based on correlating each of a plurality of received signals with a barker sequence, wherein each received signal corresponds to a respective antenna of a multiple antennas transceiver;
- a rake receiver coupled to the plurality of correlators, the rake receiver having a plurality of rake fingers corresponding to the plurality of correlation signals, wherein each of a plurality of groups of rake fingers corresponds to an estimate of a single input, multiple output (SIMO) channel;
- a coefficient selection unit coupled to the rake receiver, the coefficient selection unit to select one coefficient from each of the plurality of SIMO channel estimates;
- a transmit steering vector calculation unit coupled to the coefficient selection unit, the transmit steering vector calculation unit including a transmit steering delay calculator;
- a transmit steering vector memory coupled to the transmit steering vector calculation unit to store transmit steering vectors generated by the transmit steering vector calculation unit; and
- a transmit steering unit coupled to the transmit steering vector memory, the transmit steering unit to apply transmit steering vectors, including transmit signal delays generated by the transmit steering vector calculation unit, from the transmit steering vector memory.

* * * * *